(12) United States Patent
Xu et al.

(10) Patent No.: US 11,470,635 B2
(45) Date of Patent: Oct. 11, 2022

(54) COMMUNICATION METHOD AND DEVICE

(71) Applicant: Huawei Technologies Co., Ltd., Shenzhen (CN)

(72) Inventors: Bin Xu, Beijing (CN); Haifeng Yu, Beijing (CN); Zhenzhen Cao, Beijing (CN); Xin Xiong, Beijing (CN); Xiao Xiao, Beijing (CN); Xuelong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 142 days.

(21) Appl. No.: 16/787,971

(22) Filed: Feb. 11, 2020

(65) Prior Publication Data

US 2020/0178295 A1 Jun. 4, 2020

Related U.S. Application Data

(63) Continuation of application No. PCT/CN2018/097900, filed on Aug. 1, 2018.

(30) Foreign Application Priority Data

Aug. 11, 2017 (CN) .......................... 201710685915.4

(51) Int. Cl.
*H04W 28/02* (2009.01)
*H04W 72/14* (2009.01)
(Continued)

(52) U.S. Cl.
CPC ....... *H04W 72/14* (2013.01); *H04W 28/0278* (2013.01); *H04W 72/0446* (2013.01); *H04W 72/12* (2013.01); *H04W 72/1289* (2013.01)

(58) Field of Classification Search
None
See application file for complete search history.

(56) References Cited

U.S. PATENT DOCUMENTS

2012/0099452 A1 4/2012 Dai et al.
2012/0314672 A1 12/2012 Chen
(Continued)

FOREIGN PATENT DOCUMENTS

CN 102111808 A 6/2011
CN 102264098 A 11/2011
(Continued)

OTHER PUBLICATIONS

Sunplus mMobile, Consideration on BSR Triggers, Jan. 2008, TSG-RAN WG2 Meeting #60bis, R2-080400, pp. 1-5. (Year: 2008).*
(Continued)

*Primary Examiner* — Nicholas Sloms
(74) *Attorney, Agent, or Firm* — Leydig, Voit & Mayer, Ltd.

(57) ABSTRACT

This application provides a communication method and a device. The communication method includes: receiving a UL grant from a network device, where the UL grant is used to indicate an uplink transmission resource and transmission characteristic information; determining a first logical channel group, where each logical channel in the first logical channel group is mapped to one or more pieces of transmission characteristic information, and transmission characteristic information to which at least one logical channel in the first logical channel group is mapped matches the transmission characteristic information indicated by the UL grant; and sending a BSR of the first logical channel group to the network device by using the uplink transmission resource.

18 Claims, 10 Drawing Sheets

(51) Int. Cl.
*H04W 72/04* (2009.01)
*H04W 72/12* (2009.01)

(56) References Cited

U.S. PATENT DOCUMENTS

| | | | |
|---|---|---|---|
| 2013/0148580 A1 | 6/2013 | Han et al. | |
| 2014/0177560 A1 | 6/2014 | Guo | |
| 2017/0188349 A1* | 6/2017 | Lee | H04W 72/1215 |
| 2018/0279359 A1* | 9/2018 | Liu | H04W 72/14 |
| 2018/0302918 A1* | 10/2018 | Shaheen | H04W 72/1284 |
| 2019/0313438 A1* | 10/2019 | Zhang | H04L 5/0094 |
| 2020/0077293 A1* | 3/2020 | Lee | H04W 72/1284 |
| 2020/0137785 A1* | 4/2020 | Deogun | H04W 72/1284 |

FOREIGN PATENT DOCUMENTS

| | | |
|---|---|---|
| CN | 102984659 A | 3/2013 |
| CN | 105659679 A | 6/2016 |
| CN | 106576336 A | 4/2017 |
| CN | 106954277 A | 7/2017 |
| CN | 108271270 A | 7/2018 |
| EP | 2197235 A2 | 6/2010 |

OTHER PUBLICATIONS

"SR/BSR design for multiple numerology," 3GPP TSG-RAN WG2 #98, Hangzhou, China, R2-1704946, pp. 1-3, 3rd Generation Partnership Project, Valbonne, France (May 15-19, 2017).
"Impacts on the UL grant and LCP of different numerologies and flexible TTI," 3GPP TSG-RAN WG2 #96 Reno, Nevada, Tdoc R2-168659, XP051178215, pp. 1-4, 3rd Generation Partnership Project, Valbonne, France (Nov. 14-18, 2016).
"Discussion on BSR in NR," 3GPP TSG-RAN WG2 Meeting #98, Hangzhou, China, R2-1705311, XP051275755, pp. 1-5, 3rd Generation Partnership Project, Valbonne, France (May 15-19, 2017).
"BSR enhancements with multiple numerologies," 3GPP TSG-RAN WG2 #98, Hangzhou, China, R2-1705626, XP051275949, pp. 1-3, 3rd Generation Partnership Project, Valbonne, France (May 15-19, 2017).

* cited by examiner

COMMUNICATION METHOD AND DEVICE

CROSS-REFERENCE TO RELATED APPLICATIONS

This application is a continuation of International Application No. PCT/CN2018/097900, filed on Aug. 1, 2018, which claims priority to Chinese Patent Application No. 201710685915.4, filed on Aug. 11, 2017. The disclosures of the aforementioned applications are hereby incorporated by reference in their entireties.

TECHNICAL FIELD

This application relates to the communications field, and more specifically, to a communication method and a device.

BACKGROUND

Currently, in a wireless communications system, data communication between user equipment (UE) and a network device is implemented by scheduling a resource by the network device for the UE. For example, when the UE performs data communication with an evolved NodeB (eNB) in a long term evolution (LTE) system, a total amount of uplink data that can be sent by the UE to the eNB at a specific moment is determined by an uplink grant (UL grant) allocated by the eNB.

When the UE needs to send uplink data, the UE usually needs to first send an uplink scheduling request (SR) to request a resource from the eNB. However, the UE does not notify, in the SR, the eNB of an amount of data that needs to be sent. Therefore, after the eNB receives the SR and allocates a specified quantity of resources to the UE, the UE further needs to send a buffer status report (BSR) on the allocated resource, to indicate the amount of data that the UE needs to send, so that the eNB determines a specified quantity of resources that are to be allocated to the UE.

In LTE, when new data or data with a higher priority arrives at a specific logical channel of the UE, the logical channel triggers a BSR. When the UE has an available uplink transmission resource, a buffer size (BS) of a logical channel group including the logical channel is filled into a buffer status report media access control-control element (BSR MAC-CE) for sending on the available uplink transmission resource. In other words, the BSR of the logical channel group including the logical channel is sent by using the available uplink transmission resource.

In the prior art, an uplink transmission resource allocated by the eNB to the UE is at a UE level. In other words, BSRs of all logical channel groups of UE may be all sent on an uplink transmission resource allocated to the UE.

However, service data sent on different logical channels (or logical channel groups) of same UE may have different service features or different service scheduling requirements. Therefore, if BSRs of all the logical channel groups of the UE are all sent on a current available resource of the UE, requirements of some services having relatively high service requirements cannot be met. For example, it is assumed that a latency requirement of service data on a first logical channel of UE is 0.5 ms, and a transmission latency of a current available uplink transmission resource is 1 ms. If BSRs of all logical channel groups of the UE are all transmitted on the current available uplink transmission resource, the latency requirement of a service on the first logical channel cannot be met.

SUMMARY

This application provides a communication method and a device, to implement a differentiated uplink scheduling mechanism, so that differentiated requirements of different services can be met.

According to a first aspect, a communication method is provided, and the communication method includes: receiving, by a terminal device, an uplink grant UL grant from a network device, where the UL grant is used to indicate an uplink transmission resource, and the UL grant is further used to indicate transmission characteristic information; determining, by the terminal device, a first logical channel group, where each logical channel in the first logical channel group is mapped to one or more pieces of transmission characteristic information, and transmission characteristic information to which at least one logical channel in the first logical channel group is mapped matches the transmission characteristic information indicated by the UL grant; and sending, by the terminal device, a buffer status report BSR of the first logical channel group to the network device by using the uplink transmission resource.

In this application, in addition to the uplink transmission resource, the UL grant is further used to indicate the transmission characteristic information. Each logical channel is also mapped to transmission characteristic information, and only when transmission characteristic information to which a logical channel is mapped matches the transmission characteristic information indicated by the UL grant, a BSR of a logical channel group including the logical channel is transmitted on the uplink transmission resource indicated by the UL grant, so that differentiated scheduling of different services can be met, to meet differentiated requirements of the different services. However, a scheduling manner in the prior art is at a terminal device level. For a same terminal device, differentiated scheduling cannot be implemented, and consequently differentiated requirements of different services cannot be met.

According to a second aspect, a communication method is provided, and the communication method includes: receiving, by a terminal device, an uplink grant UL grant from a network device, where the UL grant is used to indicate an uplink transmission resource, and the UL grant is further used to indicate transmission characteristic information; determining, by the terminal device, that transmission characteristic information to which a first logical channel is mapped matches the transmission characteristic information indicated by the UL grant, where the first logical channel is a logical channel that triggers a buffer status report BSR; and sending, by the terminal device to the network device by using the uplink transmission resource, the BSR of a logical channel group including the first logical channel.

In this application, in addition to the uplink transmission resource, the UL grant is further used to indicate the transmission characteristic information, and only when the transmission characteristic information to which the first logical channel is mapped matches the transmission characteristic information indicated by the UL grant, the BSR of the logical channel group including the first logical channel is transmitted on the uplink transmission resource indicated by the UL grant, so that differentiated scheduling of different services can be met, to meet differentiated requirements of the different services. However, a scheduling manner in the prior art is at a terminal device level. For a same terminal device, differentiated scheduling cannot be implemented, and consequently differentiated requirements of different services cannot be met.

Optionally, in the UL grant, two fields are used to respectively indicate the uplink transmission resource and the transmission characteristic information. Alternatively, one field may be used to indicate both the uplink transmission resource and the transmission characteristic information.

Specifically, each logical channel group includes a plurality of logical channels. One terminal device may have one or more logical channel groups. Each of all logical channels of the terminal device is mapped to one or more pieces of transmission characteristic information.

Optionally, the transmission characteristic information described in this application may alternatively be referred to as transmission profile information or numerology information.

With reference to the first aspect, in a possible implementation of the first aspect, the first logical channel group is mapped to one or more pieces of transmission characteristic information, and the transmission characteristic information to which the first logical channel group is mapped matches the transmission characteristic information indicated by the UL grant.

Optionally, in some implementations, the determining, by the terminal device, a first logical channel group includes: performing, by the terminal device based on the transmission characteristic information indicated by the UL grant, matching and determining on transmission characteristic information to which all the logical channels or all the logical channel groups of the terminal device are mapped, to finally obtain the first logical channel group.

Optionally, transmission characteristic information to which a logical channel (or a logical channel group) is mapped described in this application matches the transmission characteristic information indicated by the UL grant. The matching herein may be strict matching or loose matching.

With reference to the first aspect or the second aspect, in a possible implementation of the first aspect or the second aspect, that transmission characteristic information to which a first logical channel is mapped matches the transmission characteristic information indicated by the UL grant includes: the transmission characteristic information indicated by the UL grant is the same as the transmission characteristic information to which the first logical channel is mapped.

With reference to the first aspect, in a possible implementation of the first aspect, that the transmission characteristic information to which the first logical channel group is mapped matches the transmission characteristic information indicated by the UL grant includes: the transmission characteristic information to which the first logical channel group is mapped is the same as the transmission characteristic information indicated by the UL grant.

In this application, in addition to the uplink transmission resource, the UL grant is further used to indicate the transmission characteristic information. Each logical channel is also mapped to transmission characteristic information, and only when transmission characteristic information to which a logical channel group (or at least one logical channel) is mapped strictly matches the transmission characteristic information indicated by the UL grant, a BSR of the logical channel group including the first logical channel is transmitted on the uplink transmission resource indicated by the UL grant, so that a service requirement of the BSR of the logical channel group can be met. Therefore, according to the solution provided in this application, differentiated uplink scheduling can be implemented, so that differentiated requirements of different services can be met.

With reference to the first aspect or the second aspect, in a possible implementation of the first aspect or the second aspect, the transmission characteristic information indicated by the UL grant includes at least one transmission parameter, and the transmission characteristic information to which the first logical channel is mapped includes at least one transmission parameter; and that transmission characteristic information to which a first logical channel is mapped matches the transmission characteristic information indicated by the UL grant includes: the at least one transmission parameter included in the transmission characteristic information to which the first logical channel is mapped is the same as the transmission parameter included in the transmission characteristic information indicated by the UL grant.

With reference to the first aspect, in a possible implementation of the first aspect, the transmission characteristic information indicated by the UL grant includes at least one transmission parameter, and the transmission characteristic information to which each logical channel in the first logical channel group is mapped includes at least one transmission parameter; and that the transmission characteristic information to which the first logical channel group is mapped matches the transmission characteristic information indicated by the UL grant includes: at least one transmission parameter included in the transmission characteristic information to which the first logical channel group is mapped is the same as the transmission parameter included in the transmission characteristic information indicated by the UL grant.

In this application, in addition to the uplink transmission resource, the UL grant is further used to indicate the transmission characteristic information. Each logical channel is also mapped to transmission characteristic information, and only when transmission characteristic information to which a logical channel group (or at least one logical channel) is mapped and the transmission characteristic information indicated by the UL grant include at least one same transmission parameter, a BSR of the logical channel group including the first logical channel is transmitted on the uplink transmission resource indicated by the UL grant, so that a service requirement of the BSR of the logical channel group can be met. Therefore, according to the solution provided in this application, differentiated uplink scheduling can be implemented, so that differentiated requirements of different services can be met.

With reference to the first aspect or the second aspect, in a possible implementation of the first aspect or the second aspect, the transmission characteristic information indicated by the UL grant includes at least one transmission parameter, and the transmission characteristic information to which the first logical channel is mapped includes at least one transmission parameter; and that transmission characteristic information to which a first logical channel is mapped matches the transmission characteristic information indicated by the UL grant includes: the at least one transmission parameter included in the transmission characteristic information to which the first logical channel is mapped meets a specified condition, where the specified condition is determined by a value of the transmission parameter included in the transmission characteristic information indicated by the UL grant.

With reference to the first aspect, in a possible implementation of the first aspect, the transmission characteristic information indicated by the UL grant includes at least one transmission parameter, and the transmission characteristic information to which each logical channel in the first logical channel group is mapped includes at least one transmission parameter; and that the transmission characteristic information to which the first logical channel group is mapped matches the transmission characteristic information indicated by the UL grant includes: at least one transmission parameter included in the transmission characteristic information to which the first logical channel group is mapped meets a specified condition, where the specified condition is determined by a value of the transmission parameter included in the transmission characteristic information indicated by the UL grant.

In this application, in addition to the uplink transmission resource, the UL grant is further used to indicate the transmission characteristic information. Each logical channel is also mapped to transmission characteristic information, and only when a transmission parameter included in transmission characteristic information to which a logical channel group (or at least one logical channel) is mapped meets a specified condition corresponding to a transmission parameter in the transmission characteristic information indicated by the UL grant, a BSR of the logical channel group including the first logical channel is transmitted on the uplink transmission resource indicated by the UL grant, so that a service requirement of the BSR of the logical channel group can be met. Therefore, according to the solution provided in this application, differentiated uplink scheduling can be implemented, so that differentiated requirements of different services can be met. However, a scheduling manner in the prior art is at a terminal device level. For a same terminal device, differentiated scheduling cannot be implemented, and consequently differentiated requirements of different services cannot be met.

Optionally, in some implementations, the UL grant directly includes the transmission characteristic information.

In an optional implementation, the UL grant includes a first field and a second field, the first field includes information used to indicate the uplink transmission resource, and the second field includes the transmission characteristic information.

In another optional implementation, the UL grant includes a third field, and the third field includes information used to indicate the uplink transmission resource and further includes the transmission characteristic information.

Optionally, in some implementations, the UL grant includes an identifier used to indicate the transmission characteristic information, in other words, the UL grant indirectly indicates the transmission characteristic information. The communication method further includes: obtaining, by the terminal device, a correspondence between the transmission characteristic information and the identifier; and obtaining, based on the correspondence and the identifier included in the UL grant, the transmission characteristic information indicated by the UL grant.

In an optional implementation, the obtaining a correspondence between the transmission characteristic information and the identifier includes: obtaining, by the terminal device, the correspondence from the network device. Correspondingly, the network device sends the correspondence to the terminal device.

Specifically, the network device sends the correspondence to the terminal device by using RRC signaling or system information.

In this implementation, the UL grant includes a first field and a second field, the first field includes information used to indicate the uplink transmission resource, and the second field includes the identifier used to indicate the transmission characteristic information. Alternatively, the UL grant includes a third field, and the third field includes information used to indicate the uplink transmission resource, and further includes the identifier used to indicate the transmission characteristic information.

In another optional implementation, the obtaining a correspondence between the transmission characteristic information and the identifier includes: obtaining, by the terminal device, the correspondence by using a preconfiguration.

In this application, in addition to the uplink transmission resource, the UL grant is further used to indicate the transmission characteristic information. Each logical channel is also mapped to transmission characteristic information, and only when transmission characteristic information to which a logical channel is mapped matches the transmission characteristic information indicated by the UL grant, a BSR of a logical channel group including the logical channel is transmitted on the uplink transmission resource indicated by the UL grant, so that differentiated scheduling of different services can be met, to meet differentiated requirements of the different services. However, a scheduling manner in the prior art is at a terminal device level. For a same terminal device, differentiated scheduling cannot be implemented, and consequently differentiated requirements of different services cannot be met.

With reference to the first aspect or the second aspect, in a possible implementation of the first aspect or the second aspect, the transmission characteristic information indicated by the UL grant includes at least one of the following transmission parameters, and the transmission characteristic information to which the first logical channel is mapped also includes at least one of the following transmission parameters: a transmission time interval TTI of the uplink transmission resource, a subcarrier spacing SCS of the uplink transmission resource, carrier information of the uplink transmission resource, and $K_2$, where $K_2$ indicates a time interval from a moment at which downlink control information DCI used for uplink scheduling is received to a moment at which uplink data is sent on the uplink transmission resource.

With reference to the first aspect, in a possible implementation of the first aspect, the transmission characteristic information indicated by the UL grant includes at least one of the following transmission parameters, and the transmission characteristic information to which the first logical channel group is mapped also includes at least one of the following transmission parameters: a transmission time interval TTI of the uplink transmission resource, a subcarrier spacing SCS of the uplink transmission resource, carrier information of the uplink transmission resource, and $K_2$, where $K_2$ indicates a time interval from a moment at which downlink control information DCI used for uplink scheduling is received to a moment at which uplink data is sent on the uplink transmission resource.

Optionally, in some implementations, the transmission characteristic information indicated by the UL grant further includes at least one of the following transmission parameters, and the transmission characteristic information to which the first logical channel is mapped also includes at least one of the following transmission parameters, or the transmission characteristic information to which the first logical channel group is mapped also includes at least one of the following transmission parameters: a resource cycle of the uplink transmission resource, a round-trip time (RTT) of the uplink transmission resource, a slot of the uplink transmission resource, a quantity of symbols included in the slot, a quantity of carriers occupied by the uplink transmission resource in frequency domain, a coding scheme corresponding to the uplink transmission resource, a multiple access mode corresponding to the uplink transmission resource, whether to perform frequency domain repetition transmission on the uplink transmission resource, whether to perform time domain repetition transmission on the uplink transmission resource, and transmit power information corresponding to the uplink transmission resource.

Optionally, the transmission characteristic information indicated by the UL grant further includes identification information used to indicate the transmission characteristic information (current transmission characteristic information).

Optionally, in an implementation, a system preconfigures a mapping relationship between transmission characteristic information and an identifier (Index). The UL grant carries an index that is used to indicate the transmission characteristic information. After receiving the UL grant, a physical layer of the terminal device directly indicates the index to a MAC layer. The MAC layer can learn of, based on system preconfiguration information and the index, the transmission characteristic information to which the index is mapped.

Optionally, in another implementation, the UL grant directly carries the transmission characteristic information. After receiving the UL grant, the physical layer of the terminal device learns of the transmission characteristic information indicated by the UL grant, and then indicates, to the MAC layer, all transmission parameters included in the transmission characteristic information.

Optionally, in another implementation, the UL grant directly carries the transmission characteristic information. After receiving the UL grant, the physical layer of the terminal device learns of the transmission characteristic information indicated by the UL grant, and then indicates, to the MAC layer, only some transmission parameters included in the transmission characteristic information indicated by the UL grant.

With reference to the first aspect, in a possible implementation of the first aspect, the communication method further includes: determining a second logical channel group, where each logical channel in the second logical channel group is mapped to one or more pieces of transmission characteristic information, and transmission characteristic information to which at least one logical channel in the second logical channel group is mapped matches the transmission characteristic information indicated by the UL grant; and the sending a BSR of the first logical channel group to the network device includes: sending BSRs of the first logical channel group and the second logical channel group to the network device.

Optionally, in some implementations, if the uplink transmission resource indicated by the UL grant is sufficient, in addition to sending the BSR of the first logical channel group to the network device, the terminal device may further send a BSR or service data of a third logical channel group by using the uplink transmission resource.

With reference to the first aspect or the second aspect, in a possible implementation of the first aspect or the second aspect, the communication method further includes: canceling a BSR of a to-be-canceled logical channel, where the to-be-canceled logical channel includes a logical channel whose BSR has been reported and/or a logical channel on which all to-be-transmitted data has been transmitted.

In this embodiment of this application, in addition to the uplink transmission resource, the UL grant is further used to indicate the transmission characteristic information. Each logical channel is also mapped to transmission characteristic information, and only when a transmission parameter included in transmission characteristic information to which a logical channel group (or at least one logical channel) is mapped meets a specified condition corresponding to a transmission parameter in the transmission characteristic information indicated by the UL grant, a BSR of the logical channel group including the first logical channel is transmitted on the uplink transmission resource indicated by the UL grant, so that a service requirement of the BSR of the logical channel group can be met. Correspondingly, in a BSR canceling process, different from the prior art in which BSRs of all logical channels of a terminal device are all canceled, only a BSR of a logical channel whose BSR has been reported or on which data transmission has been completed is canceled. In this way, differentiated uplink scheduling is implemented, so that differentiated requirements of different services can be met, and all to-be-transmitted data of the terminal device can also be transmitted.

Optionally, the BSR described in the foregoing implementations may be a regular BSR or a periodic BSR.

According to a third aspect, a communication method is provided, and the communication method includes: sending, by a network device, an uplink grant UL grant to a terminal device, where the UL grant is used to indicate an uplink transmission resource, and the UL grant is further used to indicate transmission characteristic information; and receiving, by the network device by using the uplink transmission resource, a buffer status report BSR, of a first logical channel group, that is sent by the terminal device, where each logical channel in the first logical channel group is mapped to one or more pieces of transmission characteristic information, and transmission characteristic information to which at least one logical channel in the first logical channel group is mapped matches the transmission characteristic information indicated by the UL grant.

In this application, in addition to the uplink transmission resource, the UL grant is further used to indicate the transmission characteristic information. Each logical channel is also mapped to transmission characteristic information, and only when transmission characteristic information to which a logical channel is mapped matches the transmission characteristic information indicated by the UL grant, a BSR of a logical channel group including the logical channel is transmitted on the uplink transmission resource indicated by the UL grant, so that differentiated scheduling of different services can be met, to meet differentiated requirements of the different services. However, a scheduling manner in the prior art is at a terminal device level. For a same terminal device, differentiated scheduling cannot be implemented, and consequently differentiated requirements of different services cannot be met.

It should be understood that the network device preconfigures logical channels for the terminal device, and groups the logical channels into logical channel groups.

In this application, when configuring the logical channels for the terminal device, the network device maps one or more pieces of transmission characteristic information to each logical channel.

Optionally, the logical channels may alternatively be grouped into logical channel groups based on the transmission characteristic information to which the logical channels are mapped. For example, a plurality of logical channels that are mapped to completely the same or partially the same transmission characteristic information are grouped into one logical channel group. Alternatively, a plurality of logical channels that are mapped to transmission characteristic information having a same transmission parameter are grouped into one logical channel group.

Optionally, in some implementations, after grouping the logical channels into the logical channel groups for the terminal device, the network device may further maps one or more pieces of transmission characteristic information to each logical channel group. To be specific, the first logical channel group is mapped to one or more pieces of transmission characteristic information, and the transmission characteristic information to which the first logical channel group is mapped matches the transmission characteristic information indicated by the UL grant.

Optionally, in some implementations, the transmission characteristic information indicated in the UL grant delivered by the network device to the terminal device may be determined based on the transmission characteristic information to which the logical channels of the terminal device are mapped.

Optionally, in some implementations, if the network device alternatively maps the transmission characteristic information to the logical channel groups of the terminal device in advance, the network device may determine, based on the transmission characteristic information to which the logical channel groups of the terminal device are mapped, the transmission characteristic information indicated in the UL grant.

Optionally, the network device may configure, for the terminal device by using radio resource control (RRC) signaling, a logical channel that is mapped to transmission characteristic information.

With reference to the third aspect, in a possible implementation of the third aspect, the at least one logical channel includes a first logical channel, and the first logical channel is a logical channel that triggers a BSR.

With reference to the third aspect, in a possible implementation of the third aspect, that transmission characteristic information to which at least one logical channel in the first logical channel group is mapped matches the transmission characteristic information indicated by the UL grant includes: the transmission characteristic information to which the at least one logical channel in the first logical channel group is mapped is the same as the transmission characteristic information indicated by the UL grant.

With reference to the third aspect, in a possible implementation of the third aspect, the transmission characteristic information indicated by the UL grant includes at least one transmission parameter, and the transmission characteristic information to which each logical channel in the first logical channel group is mapped includes at least one transmission parameter; and that transmission characteristic information to which at least one logical channel in the first logical channel group is mapped matches the transmission characteristic information indicated by the UL grant includes: at least one transmission parameter included in the transmission characteristic information to which the at least one logical channel in the first logical channel group is mapped is the same as the transmission parameter included in the transmission characteristic information indicated by the UL grant.

With reference to the third aspect, in a possible implementation of the third aspect, the transmission characteristic information indicated by the UL grant includes at least one transmission parameter, and the transmission characteristic information to which each logical channel in the first logical channel group is mapped includes at least one transmission parameter; and that transmission characteristic information to which at least one logical channel in the first logical channel group is mapped matches the transmission characteristic information indicated by the UL grant includes: at least one transmission parameter included in the transmission characteristic information to which the at least one logical channel in the first logical channel group is mapped meets a specified condition, where the specified condition is determined by a value of the transmission parameter included in the transmission characteristic information indicated by the UL grant.

With reference to the third aspect, in a possible implementation of the third aspect, that the transmission characteristic information to which the first logical channel group is mapped matches the transmission characteristic information indicated by the UL grant includes: the transmission characteristic information to which the first logical channel group is mapped is the same as the transmission characteristic information indicated by the UL grant.

With reference to the third aspect, in a possible implementation of the third aspect, the transmission characteristic information indicated by the UL grant includes at least one transmission parameter, and the transmission characteristic information to which each logical channel in the first logical channel group is mapped includes at least one transmission parameter; and that the transmission characteristic information to which the first logical channel group is mapped matches the transmission characteristic information indicated by the UL grant includes: at least one transmission parameter included in the transmission characteristic information to which the first logical channel group is mapped is the same as the transmission parameter included in the transmission characteristic information indicated by the UL grant.

With reference to the third aspect, in a possible implementation of the third aspect, the transmission characteristic information indicated by the UL grant includes at least one transmission parameter, and the transmission characteristic information to which each logical channel in the first logical channel group is mapped includes at least one transmission parameter; and that the transmission characteristic information to which the first logical channel group is mapped matches the transmission characteristic information indicated by the UL grant includes: at least one transmission parameter included in the transmission characteristic information to which the first logical channel group is mapped meets a specified condition, where the specified condition is determined by a value of the transmission parameter included in the transmission characteristic information indicated by the UL grant.

With reference to the third aspect, in a possible implementation of the third aspect, the UL grant includes an identifier used to indicate the transmission characteristic information; and the communication method further includes: sending, by the network device, a correspondence between the transmission characteristic information and the identifier to the terminal device.

With reference to the third aspect, in a possible implementation of the third aspect, the communication method further includes: mapping, by the network device, one or more pieces of transmission characteristic information to each logical channel in the first logical channel group; and/or mapping, by the network device, one or more pieces of transmission characteristic information to the first logical channel group.

With reference to the third aspect, in a possible implementation of the third aspect, the transmission characteristic information indicated by the UL grant includes at least one of the following transmission parameters, and the transmission characteristic information to which the first logical channel group is mapped or the transmission characteristic information to which each logical channel in the first logical channel group is mapped also includes at least one of the following transmission parameters: a transmission time interval TTI of the uplink transmission resource, a subcarrier spacing SCS of the uplink transmission resource, carrier information of the uplink transmission resource, and $K_2$, where $K_2$ indicates a time interval from a moment at which downlink control information DCI used for uplink scheduling is received to a moment at which uplink data is sent on the uplink transmission resource.

With reference to the third aspect, in a possible implementation of the third aspect, the communication method further includes: receiving, by the network device by using the uplink transmission resource, a BSR, of a second logical channel group, that is sent by the terminal device, where each logical channel in the second logical channel group is mapped to one or more pieces of transmission characteristic information, and transmission characteristic information to which at least one logical channel in the second logical channel group is mapped matches the transmission characteristic information indicated by the UL grant.

According to a fourth aspect, a terminal device is provided. The terminal device is configured to perform the method according to the first aspect or any possible implementation of the first aspect. Specifically, the terminal device may include a module configured to perform the method according to the first aspect or any possible implementation of the first aspect.

According to a fifth aspect, a terminal device is provided. The terminal device includes a memory and a processor, the memory is configured to store an instruction, the processor is configured to execute the instruction stored in the memory, and execution of the instruction stored in the memory enables the processor to perform the method according to the first aspect or any possible implementation of the first aspect.

According to a sixth aspect, a chip is provided. The chip includes a processing module and a communications interface, the processing module is configured to control the communications interface to communicate with the external, and the processing module is further configured to implement the method according to the first aspect or any possible implementation of the first aspect.

According to a seventh aspect, a computer readable storage medium is provided, and stores a computer program. When the program is executed by a computer, the method according to the first aspect or any possible implementation of the first aspect is implemented. Specifically, the computer may be the foregoing terminal device.

According to an eighth aspect, a computer program product including an instruction is provided. When the instruction is executed by a computer, the method according to the first aspect or any possible implementation of the first aspect is implemented. Specifically, the computer may be the foregoing terminal device.

According to a ninth aspect, a terminal device is provided. The terminal device is configured to perform the method according to the second aspect or any possible implementation of the second aspect. Specifically, the terminal device may include a module configured to perform the method according to the second aspect or any possible implementation of the second aspect.

According to a tenth aspect, a terminal device is provided. The terminal device includes a memory and a processor, the memory is configured to store an instruction, the processor is configured to execute the instruction stored in the memory, and execution of the instruction stored in the memory enables the processor to perform the method according to the second aspect or any possible implementation of the second aspect.

According to an eleventh aspect, a chip is provided. The chip includes a processing module and a communications interface, the processing module is configured to control the communications interface to communicate with the external, and the processing module is further configured to implement the method according to the second aspect or any possible implementation of the second aspect.

According to a twelfth aspect, a computer readable storage medium is provided, and stores a computer program. When the program is executed by a computer, the method according to the second aspect or any possible implementation of the second aspect is implemented. Specifically, the computer may be the foregoing terminal device.

According to a thirteenth aspect, a computer program product including an instruction is provided. When the instruction is executed by a computer, the method according to the second aspect or any possible implementation of the second aspect is implemented. Specifically, the computer may be the foregoing terminal device.

According to a fourteenth aspect, a network device is provided. The network device is configured to perform the method according to the third aspect or any possible implementation of the third aspect. Specifically, the network device may include a module configured to perform the method according to the third aspect or any possible implementation of the third aspect.

According to a fifteenth aspect, a network device is provided. The network device includes a memory and a processor, the memory is configured to store an instruction, the processor is configured to execute the instruction stored in the memory, and execution of the instruction stored in the memory enables the processor to perform the method according to the third aspect or any possible implementation of the third aspect.

According to a sixteenth aspect, a chip is provided. The chip includes a processing module and a communications interface, the processing module is configured to control the communications interface to communicate with the external, and the processing module is further configured to implement the method according to the third aspect or any possible implementation of the third aspect.

According to a seventeenth aspect, a computer readable storage medium is provided, and stores a computer program. When the program is executed by a computer, the method according to the third aspect or any possible implementation of the third aspect is implemented. Specifically, the computer may be the foregoing network device.

According to an eighteenth aspect, a computer program product including an instruction is provided. When the instruction is executed by a computer, the method according to the third aspect or any possible implementation of the third aspect is implemented. Specifically, the computer may be the foregoing network device.

DESCRIPTION OF EMBODIMENTS

Figure 1:
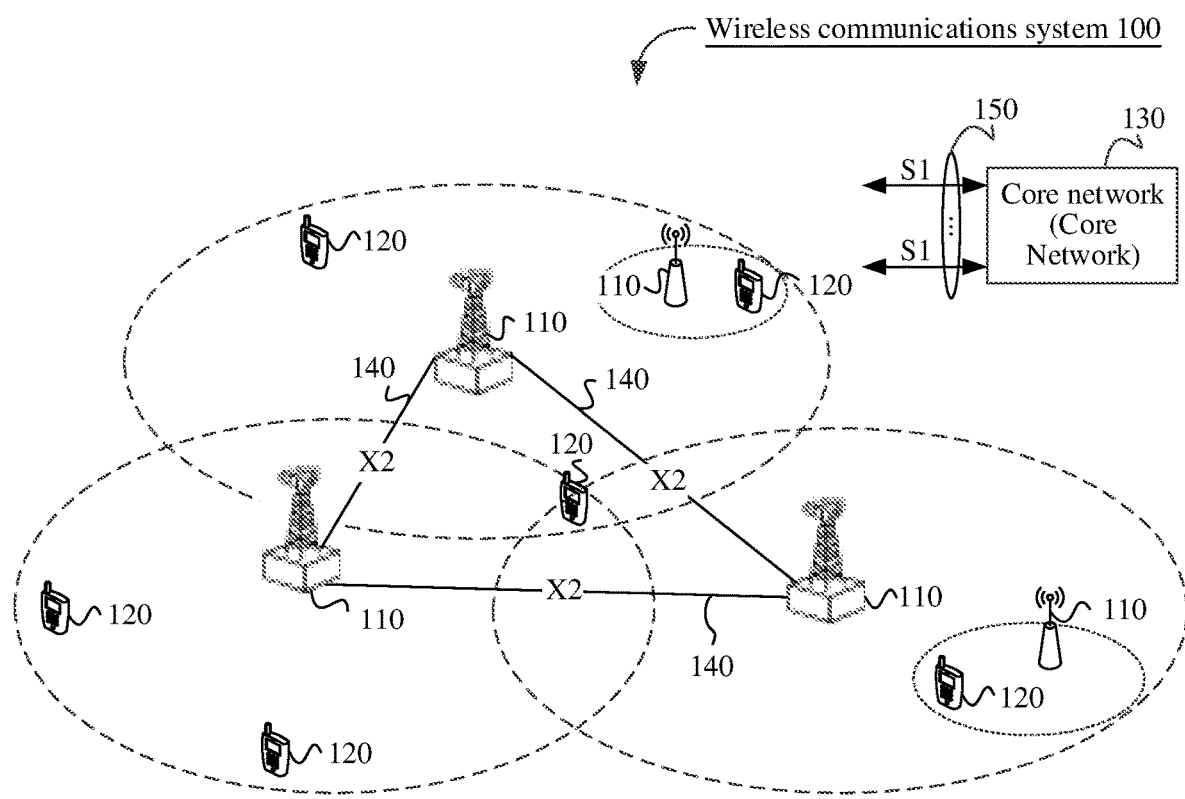
FIG. 1 is a schematic diagram of a typical wireless communications system according to an embodiment of this application.

The following describes technical solutions of this application with reference to accompanying drawings.

To better understand the solutions of this application, the following first describes an uplink scheduling procedure in the prior art by using an example in which a terminal device is UE and a network device is an eNB.

(1) When the UE needs to send uplink data, the UE sends an uplink scheduling request (SR) to the eNB. The SR is used to request an uplink transmission resource, and the UE does not notify, in the SR, the eNB of an amount of data that needs to be sent.

(2) After receiving the SR sent by the UE, the eNB allocates a specific quantity of uplink transmission resource to the UE, and sends an uplink grant (UL Grant) to the UE. The UL grant is used to indicate the uplink transmission resource allocated by the eNB to the UE.

(3) After receiving the UL grant sent by the eNB, the UE sends a buffer status report (BSR) on the uplink transmission resource indicated by UL grant. The BSR is used to indicate an amount of uplink data that needs to be sent by the UE.

It should be understood that the BSR is used to provide the eNB with an amount of data in an uplink buffer that needs to be sent by the UE.

(4) The eNB allocates, to the UE based on the BSR sent by the UE, a resource used to transmit the uplink data.

Generally, UE has one or more logical channel groups, and each logical channel group includes a plurality of logical channels. The logical channels are channels that are formed for transmitting different types of information on a physical channel. The logical channel groups may be obtained by performing grouping based on content transmitted on the logical channels. When new data or data with a higher priority arrives at a specific logical channel of the UE, the logical channel triggers a BSR. When the UE has an available uplink transmission resource, a buffer size (BS) of a logical channel group including the logical channel is filled into a buffer status report media access control-control element (BSR MAC-CE) for sending on the available uplink transmission resource. In other words, a BSR of the logical channel group including the logical channel is sent by using the available uplink transmission resource.

A BSR of a logical channel group instead of a logical channel is reported. In other words, BSRs of one or more logical channel groups, instead of a BSR of one logical channel, are reported. For example, in step (3), the BSR reported by the UE is the BSR of the logical channel group including the logical channel that triggers the BSR.

In the prior art, an uplink transmission resource allocated by the eNB to the UE is at a UE level. In other words, BSRs of all logical channel groups of UE may be all sent on an uplink transmission resource allocated to the UE.

However, service data sent on different logical channels (or logical channel groups) of same UE may have different service features or different service scheduling requirements. Therefore, if BSRs of all the logical channel groups of the UE are all sent on a current available resource of the UE without differentiation, requirements of some services having relatively high service requirements cannot be met. For example, it is assumed that a latency requirement of service data on a first logical channel of UE is 0.5 ms, and a transmission latency of a current available uplink transmission resource is 1 ms. If BSRs of all logical channel groups of the UE are all transmitted on the current available uplink transmission resource, the latency requirement of a service on the first logical channel cannot be met.

To resolve the foregoing problem, this application provides a communication method and a device, to implement a differentiated uplink scheduling mechanism, so that differentiated requirements of different services can be met.

The technical solutions in the embodiments of this application may be applied to various communications systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) system, a future evolved 5th generation (5G) mobile communications system, a new radio (NR) system, and a machine to machine communications (M2M) system.

In an example of the LTE system, FIG. 1 is a schematic diagram of a typical wireless communications system 100 according to this application. The wireless communications system 100 may include one or more network devices 110, one or more terminal devices 120, and a core network 130.

The network device 110 may be a base station. The base station may be configured to communicate with the one or more terminal devices, or may be configured to communicate with one or more base stations having some terminal functions (for example, communication between a macro base station and a micro base station (such as an access point)). The base station may be a base transceiver station (BTS) in a time division synchronous code division multiple access (TD-SCDMA) system, or an evolved NodeB (eNB) in the LTE system, or a base station in the 5G system or the new radio (NR) system. In addition, the base station may alternatively be an access point (AP), a transmission point (TRP), a central unit (CU), or another network entity, and may include some or all functions of the foregoing network entities.

The terminal device 120 may be distributed in the entire wireless communications system 100, and may be static or mobile. In some embodiments of this application, the terminal device 120 may be user equipment (UE), a mobile device, an access terminal, a subscriber unit, a subscriber station, a mobile console, a mobile station, a mobile unit, an M2M terminal, a radio unit, a remote station, a remote terminal, a remote unit, a wireless communications device, a user agent, a mobile client, or a user apparatus.

Specifically, the network device 110 may be configured to communicate with the terminal device 120 by using one or more antennas under control of a network device controller (not shown in the figure). In some embodiments, the network device controller may be a part of the core network 130, or may be integrated into the network device 110. Specifically, the network device 110 may be configured to transmit control information or user data to the core network 130 through a backhaul interface 150 (for example, an S1 interface). Specifically, the network devices 110 may also directly or indirectly communicate with each other through a backhaul interface 140 (for example, an X2 interface).

The wireless communications system shown in FIG. 1 is merely intended to more clearly describe the technical solutions in this application, but constitutes no limitation on this application. A person of ordinary skill in the art may learn that the technical solutions provided in the embodiments of this application are also applicable to a similar technical problem as a network architecture evolves and a new service scenario emerges.

Figure 2:
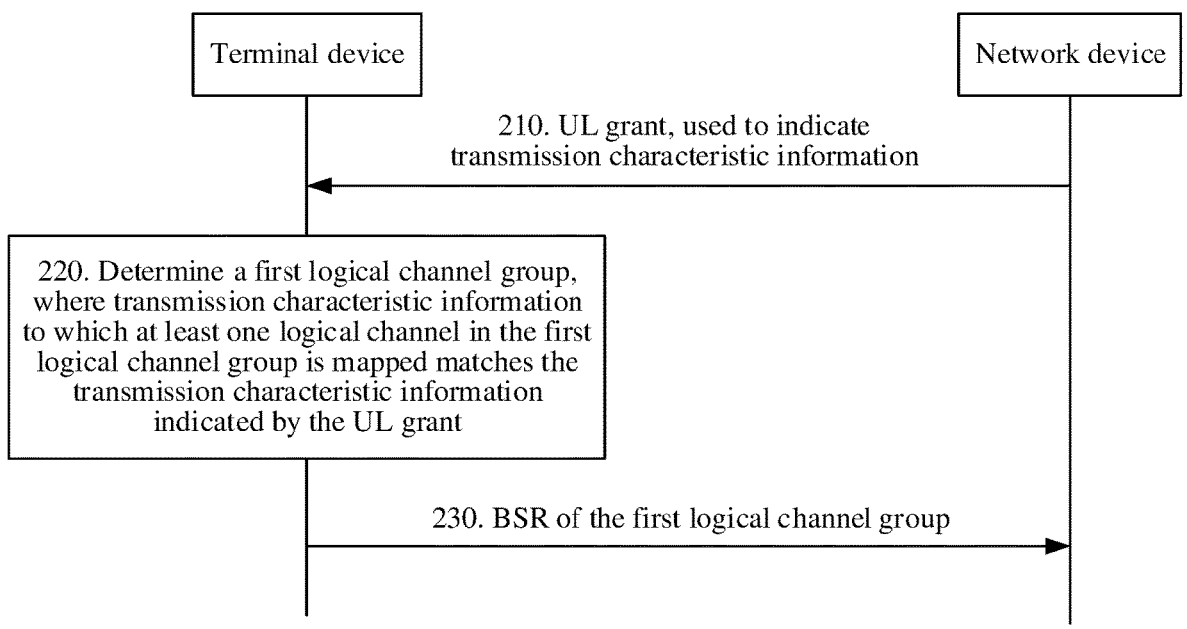
FIG. 2 is a schematic flowchart of a communication method according to an embodiment of this application.

FIG. 2 is a schematic flowchart of a communication method 200 according to an embodiment of this application. For example, a terminal device in the communication method 200 is the terminal device 120 shown in FIG. 1, and a network device in the communication method 200 is the network device 110 shown in FIG. 1. As shown in FIG. 2, the communication method 200 includes the following steps.

210. The network device sends a UL grant to the terminal device, where the UL grant is used to indicate an uplink transmission resource, and the UL grant is further used to indicate transmission characteristic information. Correspondingly, the terminal device receives the UL grant from the network device.

The transmission characteristic information indicated by the UL grant may include at least one transmission parameter, for example, other transmission parameters such as latency-related information.

Optionally, in the UL grant, two fields may be used to respectively indicate the uplink transmission resource and the transmission characteristic information. Alternatively, one field may be used to indicate both the uplink transmission resource and the transmission characteristic information. This is not limited in this embodiment of this application.

Specifically, a field, in the UL grant, that is used to indicate the transmission characteristic information may directly store the transmission characteristic information, or may store identification information used to indicate the transmission characteristic information. It should be understood that, when the UL grant includes only the identification information used to indicate the transmission characteristic information, the terminal device needs to first obtain a correspondence between the transmission characteristic information and the identification information before learning of the transmission characteristic information indicated by the UL grant. This is described in detail below.

220. The terminal device determines a first logical channel group, where each logical channel in the first logical channel group is mapped to one or more pieces of transmission characteristic information, and transmission characteristic information to which at least one logical channel in the first logical channel group is mapped matches the transmission characteristic information indicated by the UL grant.

Specifically, each logical channel group includes a plurality of logical channels. One terminal device may have one or more logical channel groups.

It should be noted that, in this embodiment of this application, each of all logical channels of the terminal device is mapped to one or more pieces of transmission characteristic information.

The transmission characteristic information to which the at least one logical channel in the first logical channel group is mapped matches the transmission characteristic information indicated by the UL grant. In other words, the first logical channel group indicates a logical channel group that is in all the logical channel groups of the terminal device and that matches the transmission characteristic information indicated by the UL grant.

230. The terminal device sends a BSR of the first logical channel group to the network device by using the uplink transmission resource. Correspondingly, the network device receives, by using the uplink transmission resource, the BSR, of the first logical channel group, that is sent by the terminal device.

Specifically, sending the BSR of the first logical channel group to the network device is specifically adding buffer status (BS) information of the first logical channel group to a BSR MAC CE for transmission on the uplink transmission resource.

In this embodiment of this application, in addition to the uplink transmission resource, the UL grant is further used to indicate the transmission characteristic information. Each logical channel is also mapped to transmission characteristic information, and only when transmission characteristic information to which a specific logical channel is mapped matches the transmission characteristic information indicated by the UL grant, a BSR of a logical channel group including the logical channel is transmitted on the uplink transmission resource indicated by the UL grant, so that differentiated scheduling of different services can be met, and differentiated requirements of the different services can be met. However, a scheduling manner in the prior art is at a terminal device level. For a same terminal device, differentiated scheduling cannot be implemented, and consequently differentiated requirements of different services cannot be met.

Optionally, the UL grant may further indicate the transmission characteristic information in the following manner: There is a mapping relationship between the UL grant and the transmission characteristic information. Specifically, both the UL grant and the corresponding transmission characteristic information are included in same downlink control information (DCI).

For example, the network device sends the DCI to the terminal device, and the DCI includes the UL grant and the corresponding transmission characteristic information or an identifier of the transmission characteristic information. After receiving the DCI at a physical layer, the terminal device parses the DCI to obtain the uplink transmission resource and the transmission characteristic information that are indicated by the UL grant, and then indicates the uplink transmission resource and the transmission characteristic information to a MAC layer.

It should be noted that, in actual application, a logical channel group including a logical channel that matches the transmission characteristic information indicated by the UL grant includes but is not limited to the first logical channel group. Optionally, in an example, step 220 further includes: determining a second logical channel group, where each logical channel in the second logical channel group is mapped to one or more pieces of transmission characteristic information, and transmission characteristic information to which at least one logical channel in the second logical channel group is mapped matches the transmission characteristic information indicated by the UL grant. Step 230 specifically includes: sending, by the terminal device, the BSR of the first logical channel group and a BSR of the second logical channel group to the network device by using the uplink transmission resource. Correspondingly, the network device receives, on the uplink transmission resource, the BSRs, of the first logical channel group and the second logical channel group, that are sent by the terminal device.

In other words, in the logical channels of the terminal device, the logical channel group including the logical channel that matches the transmission characteristic information indicated by the UL grant may be a plurality of logical channel groups, and correspondingly, BSRs of the plurality of logical channel groups are sent in a process of sending a BSR to the network device by using the uplink transmission resource.

It should be understood that, for ease of understanding and description, only one logical channel group (namely, the first logical channel group) is used as an example for description in this embodiment of this application. However, this does not constitute a limitation on the protection scope of this application.

Optionally, in some embodiments, the transmission characteristic information indicated by the UL grant includes at least one of the following transmission parameters, and the transmission characteristic information to which each logical channel in the first logical channel group is mapped also includes at least one of the following transmission parameters: a transmission time interval (TTI) of the uplink transmission resource, a subcarrier spacing (SCS) of the uplink transmission resource, carrier information of the uplink transmission resource, and $K_2$, where $K_2$ indicates a time interval from a moment at which downlink control information DCI used for uplink scheduling is received to a moment at which uplink data is sent on the uplink transmission resource.

Further, in some embodiments, the transmission characteristic information indicated by the UL grant includes at least one of the following transmission parameters, and the transmission characteristic information to which each logical channel in the first logical channel group is mapped also includes at least one of the following transmission parameters: a resource cycle of the uplink transmission resource, a round-trip time (RTT) of the uplink transmission resource, a slot of the uplink transmission resource, a quantity of symbols included in the slot, a quantity of carriers occupied by the uplink transmission resource in frequency domain, a coding scheme corresponding to the uplink transmission resource, a multiple access mode corresponding to the uplink transmission resource, whether repeated frequency domain transmission is performed on the uplink transmission resource, whether repeated time domain transmission is performed on the uplink transmission resource, and transmit power information corresponding to the uplink transmission resource.

The resource cycle indicates that the uplink transmission resource may be cyclically used at intervals of a fixed time. For example, the resource cycle is 1 ms, 2 ms, 5 ms, or a length of N1 TTIs (where N1 is a positive integer). The TTI is, for example, 1 ms, 0.5 ms, or N2 OFDM symbols (where N2 is a positive integer). Similarly, corresponding values may be assigned to the RTT, the slot, and the quantity of symbols included in the slot according to an actual situation. The carrier information indicates carrier information corresponding to the uplink transmission resource indicated by the UL grant. The subcarrier spacing indicates a size of a spacing between different subcarriers. For example, the subcarrier spacing is 15 KHz or 60 KHz. The coding scheme is, for example, a turbo code, a low-density parity-check (LDPC) code, or a polar code. The multiple access mode is, for example, OFDM or code division multiple access (CDMA). The quantity of carriers occupied in frequency domain is, for example, 12 subcarriers or 15 subcarriers. Whether repeated frequency domain transmission is performed indicates that if repeated frequency domain transmission is performed, a quantity of repeated frequency domain transmissions is further included. Whether repeated time domain transmission is performed indicates that if repeated time domain transmission is performed, a quantity of repeated time domain transmissions is further included. The transmit power information indicates transmit power used when data is sent by using the uplink transmission resource indicated by the UL grant or indicates whether a power boost (power boost) mechanism is used. The carrier information is used to indicate a carrier on which the uplink transmission resource can be transmitted. The carrier information may also be referred to as a carrier identifier. $K_2$ indicates the time interval from the moment at which the terminal device receives the DCI used for uplink scheduling to the moment at which the terminal device sends the uplink data.

Optionally, in an example, if the transmission parameter in the transmission characteristic information indicated by the UL grant includes a length of the TTI, and the transmission parameter in the transmission characteristic information to which each logical channel in the first logical channel group is mapped also includes the length of the TTI, that transmission characteristic information to which at least one logical channel in the first logical channel group is mapped matches the transmission characteristic information indicated by the UL grant means that a length of a TTI to which the at least one logical channel in the first logical channel group is mapped matches the length of the TTI indicated by the UL grant. Therefore, according to the solution in this embodiment of this application, a BSR of a low-latency service can be prevented from being transmitted on an uplink transmission resource (for example, an uplink transmission resource with a relatively high latency) that does not match a latency requirement, so that a transmission requirement of the low-latency service can be met.

In conclusion, according to the solution provided in this embodiment of this application, a differentiated uplink scheduling mechanism can be implemented, so that differentiated requirements of different services can be met.

Optionally, in some embodiments, the transmission characteristic information indicated by the UL grant further includes identification information used to indicate the transmission characteristic information (current transmission characteristic information).

Specifically, in this embodiment, the network device delivers the UL grant to the terminal device by using DCI, and the DCI further includes the identification information used to indicate the transmission characteristic information corresponding to the UL grant. The identification information may be a number or an identifier in any form that is used to indicate the transmission characteristic information corresponding to the UL grant. In this way, after receiving the transmission characteristic information in the DCI, the physical layer of the terminal device only needs to indicate the corresponding identification information to an upper layer when indicating the received transmission characteristic information to the MAC layer, so that the upper layer can obtain a transmission parameter included in the transmission characteristic information.

Optionally, in an implementation, a system preconfigures a mapping relationship between transmission characteristic information and an identifier (Index). The UL grant carries an index used to indicate the transmission characteristic information. After receiving the UL grant, the physical layer of the terminal device directly indicates the index to the MAC layer. The MAC layer can learn of, based on the information and the index that are preconfigured by the system, the transmission characteristic information to which the index is mapped.

Optionally, in another implementation, the UL grant directly carries the transmission characteristic information. After receiving the UL grant, the physical layer of the terminal device learns of the transmission characteristic information indicated by the UL grant, and then indicates all transmission parameters included in the transmission characteristic information to the MAC layer.

Optionally, in another implementation, the UL grant directly carries the transmission characteristic information. After receiving the UL grant, the physical layer of the terminal device learns of the transmission characteristic information indicated by the UL grant, and then indicates, to the MAC layer, only some transmission parameters included in the transmission characteristic information indicated by the UL grant.

The transmission characteristic information described in this application may also be referred to as transmission profile information or numerology information. It should be understood that, with evolution of a network architecture and emergence of a new service scenario, the transmission characteristic information described in this application may have another name. This is not limited in this application.

It should be understood that the network device preconfigures logical channels for the terminal device, and groups the logical channels into logical channel groups.

In this application, when configuring the logical channels for the terminal device, the network device maps one or more pieces of transmission characteristic information to each logical channel.

For example, if it is configured that a logical channel LCH 1 is mapped to transmission characteristic information profile 1, it indicates that a BSR (or service data) of the logical channel LCH 1 needs to be transmitted in a transmission manner matching the transmission characteristic information profile 1. In other words, the BSR (or the service data) of the logical channel LCH 1 needs to be transmitted on an uplink transmission resource matching the transmission characteristic information profile 1.

Optionally, the logical channels may alternatively be grouped into the logical channel groups based on the transmission characteristic information to which each logical channel is mapped. For example, a plurality of logical channels that are mapped to completely the same or partially the same transmission characteristic information are grouped into one logical channel group. Alternatively, a plurality of logical channels that are mapped to transmission characteristic information including a same transmission parameter are grouped into one logical channel group.

For example, if it is configured that a logical channel group LCG 1 is mapped to transmission characteristic information profile 2, it indicates that a BSR (or service data) of the logical channel group LCG 1 needs to be transmitted in a transmission manner matching the transmission characteristic information profile 2. In other words, the BSR (or the service data) of the logical channel group LCG 1 needs to be transmitted on an uplink transmission resource matching the transmission characteristic information profile 2.

Optionally, in some embodiments, after grouping the logical channels into the logical channel groups for the terminal device, the network device may further maps one or more pieces of transmission characteristic information to each logical channel group.

Specifically, one logical channel group is used as an example. Transmission characteristic information to which a specific logical channel in the logical channel group is mapped may be used as transmission characteristic information to which the logical channel group is mapped. Alternatively, transmission characteristic parameters to which the logical channel group is mapped are determined based on a shared transmission parameter in transmission characteristic information to which logical channels in the logical channel group are mapped. In other words, the transmission characteristic parameters to which the logical channel group is mapped include the shared transmission parameter in the transmission characteristic information to which logical channels in the logical channel group are mapped.

Optionally, in some embodiments, the transmission characteristic information indicated by the UL grant delivered by the network device to the terminal device may be determined based on the transmission characteristic information to which each logical channel of the terminal device is mapped.

For example, the network device uses, as the transmission characteristic information indicated by the UL grant, transmission characteristic information to which a specific logical channel of the terminal device is mapped.

Optionally, in some embodiments, if the network device maps the transmission characteristic information to each logical channel group of the terminal device in advance, the network device may determine, based on the transmission characteristic information to which each logical channel group of the terminal device is mapped, the transmission characteristic information indicated by the UL grant.

For example, the network device uses, as the transmission characteristic information indicated by the UL grant, transmission characteristic information to which a specific logical channel group of the terminal device is mapped.

It should be understood that the network device may configure, for the terminal device by using radio resource control (RRC) signaling, a logical channel mapped to transmission characteristic information.

Specifically, in step 220, the terminal device performs, based on the transmission characteristic information indicated by the UL grant, matching and determining on the transmission characteristic information to which each logical channel or each logical channel group of the terminal device is mapped, to finally obtain the first logical channel group.

Specifically, an example in which the logical channel group of the terminal device is mapped to no transmission characteristic information is used. The terminal device performs determining on each logical channel, and determines whether transmission characteristic information to which each logical channel is mapped matches the transmission characteristic information indicated by the UL grant. If a determining result of a specific logical channel is that transmission characteristic information to which the logical channel is mapped does not match the transmission characteristic information indicated by the UL grant, a BSR of a logical channel group including the logical channel is not transmitted on the uplink transmission resource indicated by the UL grant. If a determining result of a specific logical channel is that transmission characteristic information to which the logical channel is mapped matches the transmission characteristic information indicated by the UL grant, a BSR of a logical channel group including the logical channel is transmitted on the uplink transmission resource indicated by the UL grant. Correspondingly, in the embodiment shown in FIG. 2, the first logical channel group indicates any logical channel group in logical channel groups including a logical channel whose determining result is that transmission characteristic information to which the logical channel is mapped matches the transmission characteristic information indicated by the UL grant.

Specifically, an example in which a logical channel group of the terminal device is mapped to transmission characteristic information is used. The terminal device performs determining on each logical channel group, and determines whether transmission characteristic information to which each logical channel group is mapped matches the transmission characteristic information indicated by the UL grant. If a determining result of a specific logical channel group is that transmission characteristic information to which the logical channel group is mapped does not match the transmission characteristic information indicated by the UL grant, a BSR of the logical channel group is not transmitted on the uplink transmission resource indicated by the UL grant. If a determining result of a specific logical channel group is that transmission characteristic information to which the logical channel group is mapped matches the transmission characteristic information indicated by the UL grant, a BSR of the logical channel group including the first logical channel is transmitted on the uplink transmission resource indicated by the UL grant. Correspondingly, in the embodiment shown in FIG. 2, the first logical channel group indicates any logical channel group that is in logical channel groups and whose determining result is that transmission characteristic information to which the logical channel group is mapped matches the transmission characteristic information indicated by the UL grant.

It should be noted that, as described in this application, transmission characteristic information to which a logical channel (or a logical channel group) is mapped matches the transmission characteristic information indicated by the UL grant. The matching herein may be strict matching or loose matching. Several optional matching manners are described in detail below.

First Matching Manner:

In some embodiments, that transmission characteristic information to which at least one logical channel in the first logical channel group is mapped matches the transmission characteristic information indicated by the UL grant specifically means that the transmission characteristic information to which the at least one logical channel in the first logical channel group is mapped is the same as the transmission characteristic information indicated by the UL grant.

Assuming that transmission characteristic information (denoted as transmission characteristic information A) to which a logical channel 1 in the first logical channel group is mapped is the same as the transmission characteristic information (denoted as transmission characteristic information B) indicated by the UL grant, the transmission characteristic information A and the transmission characteristic information B are completely the same, and transmission parameters included in the transmission characteristic information A are the same as transmission parameters included in the transmission characteristic information B one by one. For example, the transmission characteristic information A and the transmission characteristic information B each include the following transmission parameters: a resource cycle, a TTI, an RTT, a slot, and a quantity of symbols included in the slot, a subcarrier spacing, a coding scheme, a multiple access mode, and transmit power information. One value is assigned to a same transmission parameter included in the transmission characteristic information A and the transmission characteristic information B.

Figure 3:
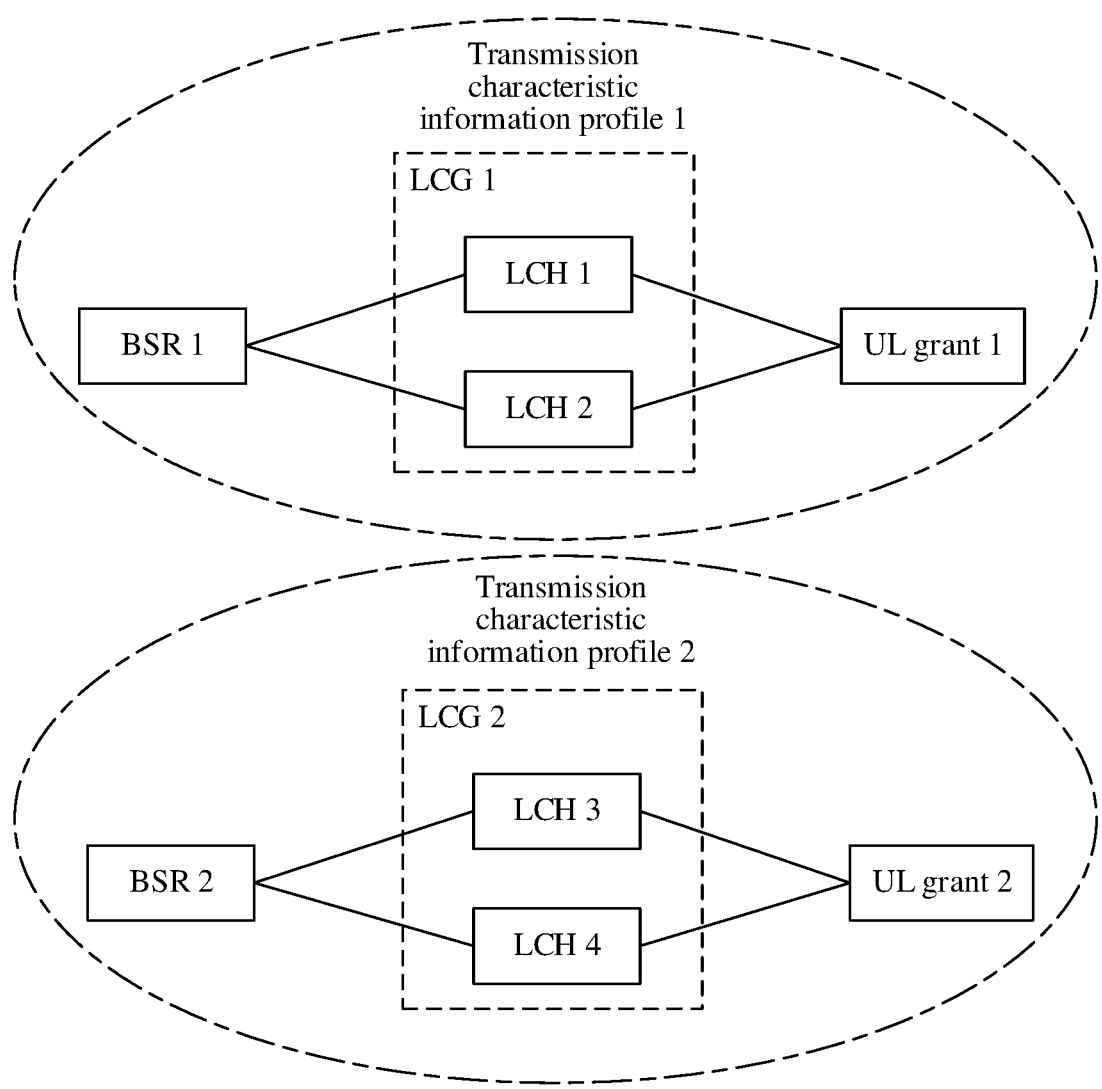
FIG. 3 is a schematic diagram of logical channel groups and UL grants that match with each other according to an embodiment of this application.

Specifically, as shown in FIG. 3, logical channels LCH 1 and LCH 2 constitute a logical channel group LCG 1, and logical channels LCH 3 and LCH 4 constitute a logical channel group LCG 2. The logical channels LCH 1 and LCH 2 each are mapped to at least transmission characteristic information profile 1, the logical channels LCH 3 and LCH 4 each are mapped to at least transmission characteristic information profile 2, a UL grant 1 indicates the transmission characteristic information profile 1, and a UL grant 2 indicates the transmission characteristic information profile 2. In the first matching manner, an uplink transmission resource indicated by the UL grant 1 can be used to transmit only a BSR 1 of the logical channel group LCG 1. In other words, a BSR transmitted on the uplink transmission resource indicated by the UL grant 1 can be used to encapsulate only a buffer size (Buffer size, BS) of the logical channel group LCG 1. An uplink transmission resource indicated by the UL grant 2 can be used to transmit only a BSR 2 of the logical channel group LCG 2. In other words, a BSR transmitted on the uplink transmission resource indicated by the UL grant 2 can be used to encapsulate only a BS of the logical channel group LCG 2.

Correspondingly, in an embodiment in which each logical channel group of the terminal device is mapped to transmission characteristic information, that transmission characteristic information to which the first logical channel group is mapped matches the transmission characteristic information indicated by the UL grant specifically means that the transmission characteristic information to which the first logical channel group is mapped is the same as the transmission characteristic information indicated by the UL grant.

Still in an example of FIG. 3, it is assumed that a logical channel group LCG 1 is mapped to at least transmission characteristic information profile 1, a logical channel group LCG 2 is mapped to at least transmission characteristic information profile 2, a UL grant 1 indicates the transmission characteristic information profile 1, and a UL grant 2 indicates the transmission characteristic information profile 2. In the first matching manner, an uplink transmission resource indicated by the UL grant 1 can be used to transmit only a BSR 1 of the logical channel group LCG 1. In other words, a BSR transmitted on the uplink transmission resource indicated by the UL grant 1 can be used to encapsulate only a buffer size (Buffer size, BS) of the logical channel group LCG 1. An uplink transmission resource indicated by the UL grant 2 can be used to transmit only a BSR 2 of the logical channel group LCG 2. In other words, a BSR transmitted on the uplink transmission resource indicated by the UL grant 2 can be used to encapsulate only a BS of the logical channel group LCG 2.

It should be understood that the first matching manner is a strict matching manner.

In this embodiment of this application, in addition to the uplink transmission resource, the UL grant is further used to indicate the transmission characteristic information. Each logical channel is also mapped to transmission characteristic information, and only when transmission characteristic information to which a specific logical channel group (or at least one logical channel in the logical channel group) is mapped strictly matches the transmission characteristic information indicated by the UL grant, a BSR of the logical channel group including the first logical channel is transmitted on the uplink transmission resource indicated by the UL grant, so that a service requirement of the BSR of the logical channel group can be met. Therefore, according to the solution provided in this application, differentiated uplink scheduling is implemented, so that differentiated requirements of different services can be met.

Second Matching Manner:

In some embodiments, the transmission characteristic information indicated by the UL grant includes at least one transmission parameter, and the transmission characteristic information to which each logical channel in the first logical channel group is mapped includes at least one transmission parameter. That transmission characteristic information to which at least one logical channel in the first logical channel group is mapped matches the transmission characteristic information indicated by the UL grant specifically means that at least one transmission parameter included in the transmission characteristic information to which the at least one logical channel in the first logical channel group is mapped is the same as the transmission parameter included in the transmission characteristic information indicated by the UL grant.

Correspondingly, in an embodiment in which each logical channel group of the terminal device is mapped to transmission characteristic information, the transmission characteristic information indicated by the UL grant includes at least one transmission parameter, and the transmission characteristic information to which each logical channel in the first logical channel group is mapped includes at least one transmission parameter. That transmission characteristic information to which the first logical channel group is mapped matches the transmission characteristic information indicated by the UL grant specifically means that at least one transmission parameter included in the transmission characteristic information to which the first logical channel group is mapped is the same as the transmission parameter included in the transmission characteristic information indicated by the UL grant.

Specifically, when matching is performed on the transmission characteristic information to which each logical channel (or a logical channel group) is mapped, based on the transmission characteristic information indicated by the UL grant, matching does not necessarily mean that all transmission parameters included in transmission characteristic information to which a specific logical channel (or a specific logical channel group) is mapped are the same as all the transmission parameters included in the transmission characteristic information indicated by the UL grant one by one, but it is considered that matching is implemented as long as there is at least one same transmission parameter.

For example, transmission characteristic information to which a logical channel group LCG 1 is mapped includes a TTI 1 and a resource cycle. Transmission characteristic information to which a logical channel group LCG 2 is mapped includes a subcarrier spacing 1 and a multiple access mode. Transmission characteristic information indicated by the UL grant 1 includes a TTI 2 and a coding scheme. Transmission characteristic information indicated by the UL grant 2 includes a subcarrier spacing 2 and a coding scheme. The TTI 1 is equal to the TTI 2, and the subcarrier spacing 1 is equal to the subcarrier spacing 2. In the second matching manner, an uplink transmission resource indicated by the UL grant 1 can be used to transmit only a BSR of the logical channel group LCG 1. In other words, a BSR transmitted on the uplink transmission resource indicated by the UL grant 1 can be used to encapsulate only a buffer size (BS) of the logical channel group LCG 1. An uplink transmission resource indicated by the UL grant 2 can be used to transmit only a BSR of the logical channel group LCG 2. In other words, a BSR transmitted on the uplink transmission resource indicated by the UL grant 2 can be used to encapsulate only a BS of the logical channel group LCG 2.

In this embodiment of this application, in addition to the uplink transmission resource, the UL grant is further used to indicate the transmission characteristic information. Each logical channel is also mapped to transmission characteristic information, and only when transmission characteristic information to which a specific logical channel group (or at least one logical channel in the logical channel group) is mapped and the transmission characteristic information indicated by the UL grant include at least one same transmission parameter, a BSR of the logical channel group including the first logical channel is transmitted on the uplink transmission resource indicated by the UL grant, so that a service requirement of the BSR of the logical channel group can be met. Therefore, according to the solution provided in this application, differentiated uplink scheduling is implemented, so that differentiated requirements of different services can be met.

Third Matching Manner:

In some embodiments, the transmission characteristic information indicated by the UL grant includes at least one transmission parameter, and the transmission characteristic information to which each logical channel in the first logical channel group is mapped includes at least one transmission parameter. That transmission characteristic information to which at least one logical channel in the first logical channel group is mapped matches the transmission characteristic information indicated by the UL grant specifically means that at least one transmission parameter included in the transmission characteristic information to which the at least one logical channel in the first logical channel group is mapped meets a specified condition. The specified condition is determined by a value of the transmission parameter included in the transmission characteristic information indicated by the UL grant.

Correspondingly, in an embodiment in which each logical channel group of the terminal device is mapped to transmission characteristic information, the transmission characteristic information indicated by the UL grant includes at least one transmission parameter, and the transmission characteristic information to which each logical channel in the first logical channel group is mapped includes at least one transmission parameter. That the transmission characteristic information to which the first logical channel group is mapped matches the transmission characteristic information indicated by the UL grant specifically means that at least one transmission parameter included in the transmission characteristic information to which the first logical channel group is mapped meets a specified condition. The specified condition is determined by a value of the transmission parameter included in the transmission characteristic information indicated by the UL grant.

Specifically, the specified condition indicates that when transmission characteristic information to which a specific logical channel is mapped and the transmission characteristic information indicated by the UL grant each include a transmission parameter A, a value of the transmission parameter A included in the transmission characteristic information to which the logical channel is mapped is greater or less than a value of the transmission parameter A included in the transmission characteristic information indicated by the UL grant. For example, if a value of a transmission parameter TTI included in the transmission characteristic information indicated by the UL grant is T1, the specified condition is that a transmission parameter TTI is greater than or equal to T1.

Figure 4:
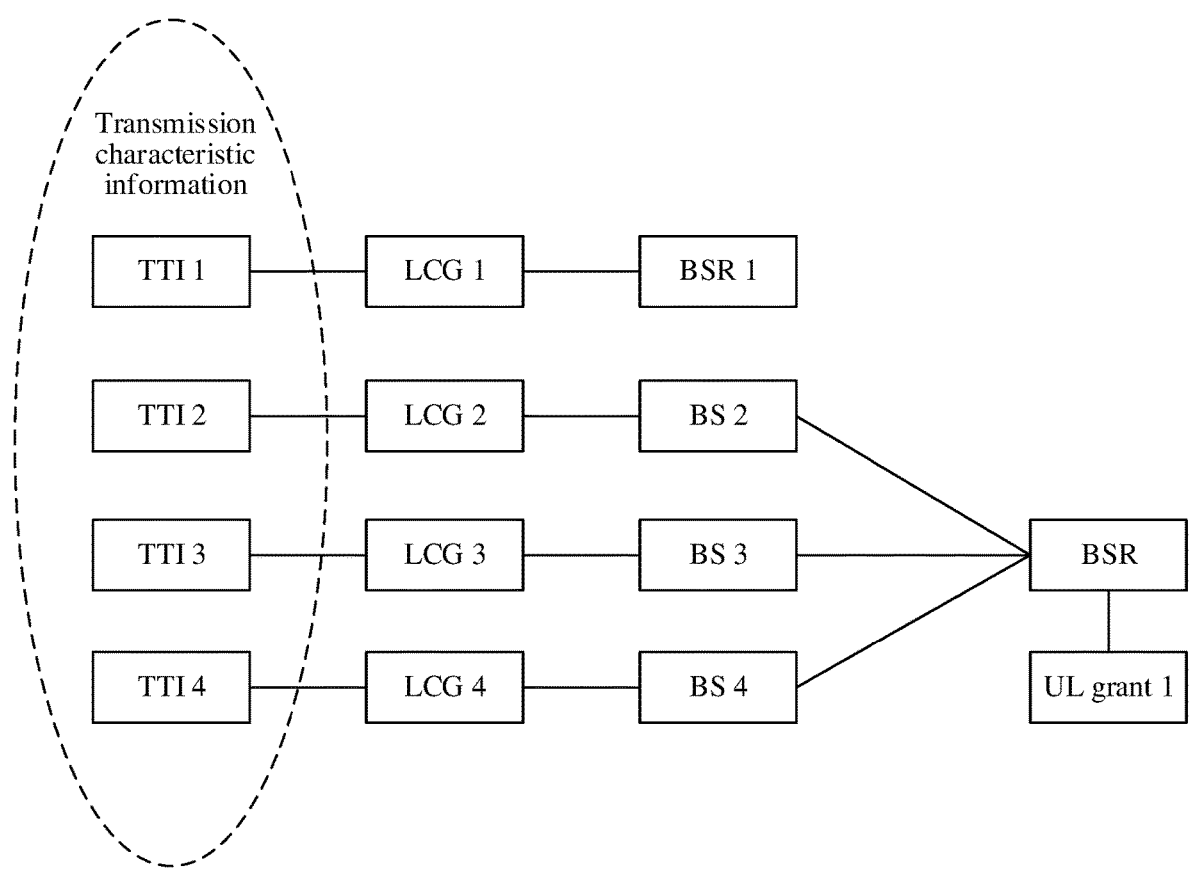
FIG. 4 is another schematic diagram of logical channel groups and UL grants that match with each other according to an embodiment of this application.

Specifically, as shown in FIG. 4, it is assumed that four pieces of transmission characteristic information to which four logical channel groups LCG 1, LCG 2, LCH 3, and LCG 4 are mapped all includes TTIs, which are respectively a TTI 1, a TTI 2, a TTI 3, and a TTI 4, where TTI1=TTI2=TTI3>TTI4. It is assumed that transmission characteristic information indicated by a received UL grant 1 includes a TTI 5, and a corresponding specified condition is that a TTI is greater than or equal to the TTI 5. If TTI 4<TTI 5<TTI 3, in the third matching manner, an uplink transmission resource indicated by the UL grant 1 can be used to transmit BSRs of the logical channel groups LCG 1, LCG 2, and LCH 3, but cannot be used to transmit a BSR of the logical channel group LCG 4. In other words, a BSR transmitted on the uplink transmission resource indicated by the UL grant 1 can be used to encapsulate only BSs (such as a BS 1, a BS 2, and a BS 3 shown in FIG. 4) of the logical channel groups LCG 1, LCG 2, and LCG 3. If TTI 5<TTI 4, in the third matching manner, the uplink transmission resource indicated by the UL grant 1 can be used to transmit BSRs of the logical channel groups LCG 1, LCG 2, LCG 3, and LCG 4. In other words, the BSR transmitted on the uplink transmission resource indicated by the UL grant 1 can be used to encapsulate BSs (such as a BS 1, a BS 2, a BS 3, and a BS 4 shown in FIG. 4) of the logical channel groups LCG 1, LCG 2, LCG 3, and LCG 4.

It should be understood that, in the foregoing example with reference to FIG. 4, the transmission characteristic information indicated by the UL grant 1 includes the TTI 5, and the corresponding specified condition is that a TTI is greater than or equal to the TTI 5. In this case, BSRs of services for which a TTI needs to be greater than or equal to the TTI 5 are transmitted on the uplink transmission resource indicated by the grant 1, and latency requirements of these services can be definitely met.

In this embodiment of this application, in addition to the uplink transmission resource, the UL grant is further used to indicate the transmission characteristic information. Each logical channel is also mapped to transmission characteristic information, and only when a transmission parameter included in transmission characteristic information to which a specific logical channel group (or at least one logical channel in the logical channel group) is mapped meets a specified condition corresponding to a transmission parameter in the transmission characteristic information indicated by the UL grant, a BSR of the logical channel group including the first logical channel is transmitted on the uplink transmission resource indicated by the UL grant, so that a service requirement of the BSR of the logical channel group can be met. Therefore, according to the solution provided in this application, differentiated uplink scheduling is implemented, so that differentiated requirements of different services can be met. However, a scheduling manner in the prior art is at a terminal device level. For a same terminal device, differentiated scheduling cannot be implemented, and consequently differentiated requirements of different services cannot be met.

Optionally, in some embodiments, the UL grant directly includes the transmission characteristic information.

In an optional implementation, the UL grant includes a first field and a second field, the first field includes information used to indicate the uplink transmission resource, and the second field includes the transmission characteristic information.

In another optional implementation, the UL grant includes a third field and the transmission characteristic information, and the third field includes information used to indicate the uplink transmission resource.

Optionally, in some embodiments, the UL grant includes an identifier used to indicate the transmission characteristic information. In other words, the UL grant indirectly indicates the transmission characteristic information. The communication method 200 further includes: obtaining, by the terminal device, a correspondence between the transmission characteristic information and the identifier; and obtaining, based on the correspondence and the identifier included in the UL grant, the transmission characteristic information indicated by the UL grant.

In an optional implementation, the obtaining a correspondence between the transmission characteristic information and the identifier includes: obtaining, by the terminal device, the correspondence from the network device. Correspondingly, the network device sends the correspondence to the terminal device.

Specifically, the network device sends the correspondence to the terminal device by using RRC signaling or system information.

In this implementation, the UL grant includes a first field and a second field, the first field includes information used to indicate the uplink transmission resource, and the second field includes the identifier used to indicate the transmission characteristic information. Alternatively, the UL grant includes a third field and the identifier used to indicate the transmission characteristic information, and the third field includes information used to indicate the uplink transmission resource.

In another optional implementation, the obtaining a correspondence between the transmission characteristic information and the identifier includes: obtaining, by the terminal device, the correspondence by using a preconfiguration (protocol configuration).

Optionally, in some embodiments, in step 230, if the uplink transmission resource indicated by the UL grant is sufficient, in addition to the BSR of the first logical channel group, the terminal device may further send a BSR or service data of a third logical channel group to the network device by using the uplink transmission resource.

In the prior art, in a BSR reporting process, BSRs of all logical channel groups of a terminal device are reported. Correspondingly, after the BSR reporting process is completed, the BSRs of all the logical channel groups of the terminal device are canceled. However, in this application, in a BSR reporting process, BSRs of all logical channel groups of a terminal device are not necessarily reported. Therefore, a BSR canceling process is different from that in the prior art. To be specific, only a BSR of a logical channel group whose BSR has been reported is canceled.

Optionally, in some embodiments, the communication method 200 further includes: canceling a BSR of a to-be-canceled logical channel, where the to-be-canceled logical channel includes a logical channel whose BSR has been reported and/or a logical channel on which all to-be-transmitted data has been transmitted.

Specifically, a BSR of a logical channel whose BSR that has been reported in step 230 is canceled, for example, a BSR of the first logical channel is canceled. If a BSR of a second logical channel is further reported in step 230, the BSRs of the first logical channel and the second logical channel need to be canceled. If a BSR of a third logical channel is further reported in step 230, the BSRs of the first logical channel, the second logical channel, and the third logical channel need to be canceled. If data transmission on the third logical channel is further completed in step 230, the BSRs of the first logical channel, the second logical channel, and the third logical channel need to be canceled.

In this embodiment of this application, in addition to the uplink transmission resource, the UL grant is further used to indicate the transmission characteristic information. Each logical channel is also mapped to transmission characteristic information, and only when a transmission parameter included in transmission characteristic information to which a specific logical channel group (or at least one logical channel in the logical channel group) is mapped meets a specified condition corresponding to a transmission parameter in the transmission characteristic information indicated by the UL grant, a BSR of the logical channel group including the first logical channel is transmitted on the uplink transmission resource indicated by the UL grant, so that a service requirement of the BSR of the logical channel group can be met. Correspondingly, in the BSR canceling process, different from the prior art in which BSRs of all logical channels of a terminal device are all canceled, only a BSR of a logical channel whose BSR has been reported or on which data transmission has been completed is canceled. In this way, differentiated uplink scheduling is implemented, so that differentiated requirements of different services can be met, and all to-be-transmitted data of the terminal device can also be transmitted.

Figure 5:
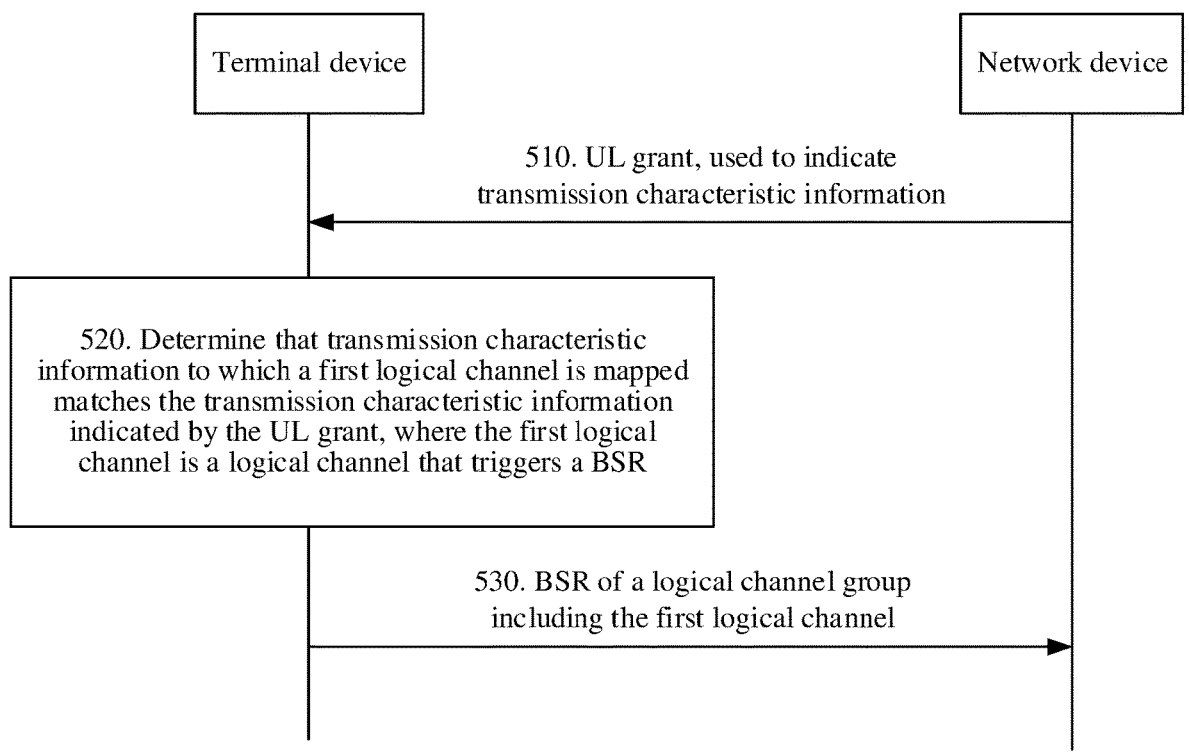
FIG. 5 is another schematic flowchart of a communication method according to an embodiment of this application.

FIG. 5 is a schematic flowchart of another communication method 500 according to an embodiment of this application. For example, a terminal device in the communication method 500 is the terminal device 120 shown in FIG. 1, and a network device in the communication method 500 is the network device 110 shown in FIG. 1. As shown in FIG. 5, the communication method 500 includes the following steps.

510. The network device sends a UL grant to the terminal device, where the UL grant is used to indicate an uplink transmission resource, and the UL grant is further used to indicate transmission characteristic information. Correspondingly, the terminal device receives the UL grant from the network device.

This step is the same as step 210. For details, refer to the foregoing descriptions. For brevity, details are not described herein again.

520. The terminal device determines that transmission characteristic information to which a first logical channel is mapped matches the transmission characteristic information indicated by the UL grant, where the first logical channel is a logical channel that triggers a buffer status report BSR.

Specifically, the terminal device determines logical channels that are mapped to transmission characteristic information matching the transmission characteristic information indicated by the UL grant and that are in logical channels that trigger BSRs. After the determining, it is determined that the transmission characteristic information to which the first logical channel is mapped matches the transmission characteristic information indicated by the UL grant.

530. The terminal device sends, to the network device by using the uplink transmission resource, the BSR of a logical channel group including the first logical channel. Correspondingly, the network device receives the BSR, of the logical channel group including the first logical channel, that is sent by the terminal device by using the uplink transmission resource.

In this embodiment of this application, in addition to the uplink transmission resource, the UL grant is further used to indicate the transmission characteristic information, and only when the transmission characteristic information to which the first logical channel is mapped matches the transmission characteristic information indicated by the UL grant, the BSR of the logical channel group including the first logical channel is transmitted on the uplink transmission resource indicated by the UL grant, so that differentiated scheduling of different services can be met, to meet differentiated requirements of the different services. However, a scheduling manner in the prior art is at a terminal device level. For a same terminal device, differentiated scheduling cannot be implemented, and consequently differentiated requirements of different services cannot be met.

Specifically, in this embodiment, the transmission characteristic information to which the first logical channel is mapped matches the transmission characteristic information indicated by the UL grant. The matching herein may be strict matching or loose matching.

Optionally, in this embodiment, that transmission characteristic information to which the first logical channel is mapped matches the transmission characteristic information indicated by the UL grant includes: The transmission characteristic information indicated by the UL grant is the same as the transmission characteristic information to which the first logical channel is mapped.

Specifically, for details, refer to the foregoing descriptions of the first matching manner. For brevity, details are not described again.

In this embodiment of this application, in addition to the uplink transmission resource, the UL grant is further used to indicate the transmission characteristic information. Each logical channel is also mapped to transmission characteristic information, and only when the transmission characteristic information to which the first logical channel is mapped strictly matches the transmission characteristic information indicated by the UL grant, the BSR of the logical channel group including the first logical channel is transmitted on the uplink transmission resource indicated by the UL grant, so that a service requirement of the BSR of the logical channel group can be met. Therefore, according to the solution provided in this application, differentiated uplink scheduling can be implemented, so that differentiated requirements of different services can be met.

Optionally, in this embodiment, the transmission characteristic information indicated by the UL grant includes at least one transmission parameter, and the transmission characteristic information to which the first logical channel is mapped includes at least one transmission parameter. That the transmission characteristic information to which the first logical channel is mapped matches the transmission characteristic information indicated by the UL grant includes: The at least one transmission parameter included in the transmission characteristic information to which the first logical channel is mapped is the same as the transmission parameter included in the transmission characteristic information indicated by the UL grant.

Specifically, for details, refer to the foregoing descriptions of the second matching manner. For brevity, details are not described again.

In this embodiment of this application, in addition to the uplink transmission resource, the UL grant is further used to indicate the transmission characteristic information. Each logical channel is also mapped to transmission characteristic information, and only when the transmission characteristic information to which the first logical channel is mapped and the transmission characteristic information indicated by the UL grant include at least one same transmission parameter, the BSR of the logical channel group including the first logical channel is transmitted on the uplink transmission resource indicated by the UL grant, so that a service requirement of the BSR of the logical channel group can be met. Therefore, according to the solution provided in this application, differentiated uplink scheduling can be implemented, so that differentiated requirements of different services can be met.

Optionally, in this embodiment, the transmission characteristic information indicated by the UL grant includes at least one transmission parameter, and the transmission characteristic information to which the first logical channel is mapped includes at least one transmission parameter. That the transmission characteristic information to which the first logical channel is mapped matches the transmission characteristic information indicated by the UL grant includes: The at least one transmission parameter included in the transmission characteristic information to which the first logical channel is mapped meets a specified condition, where the specified condition is determined by a value of the transmission parameter included in the transmission characteristic information indicated by the UL grant.

Specifically, for details, refer to the foregoing descriptions of the third matching manner. For brevity, details are not described again.

In this application, in addition to the uplink transmission resource, the UL grant is further used to indicate the transmission characteristic information. Each logical channel is also mapped to transmission characteristic information, and only when a transmission parameter included in the transmission characteristic information to which the first logical channel is mapped meets a specified condition corresponding to a transmission parameter in the transmission characteristic information indicated by the UL grant, the BSR of the logical channel group including the first logical channel is transmitted on the uplink transmission resource indicated by the UL grant, so that a service requirement of the BSR of the logical channel group can be met. Therefore, according to the solution provided in this application, differentiated uplink scheduling can be implemented, so that differentiated requirements of different services can be met. However, a scheduling manner in the prior art is at a terminal device level. For a same terminal device, differentiated scheduling cannot be implemented, and consequently differentiated requirements of different services cannot be met.

It can be learned from the foregoing that a difference between the communication method 500 and the communication method 200 provided above lies in an object that matches the transmission characteristic information to which the UL grant is mapped.

In the communication method 500, only a logical channel that triggers a BSR is determined, a logical channel that triggers a BSR and that is mapped to transmission characteristic information matching the transmission characteristic information to which the UL grant is mapped is determined, and then the BSR of a logical channel group including the matched logical channel (namely, the first logical channel) is reported to the network device.

However, in the communication method 200, all logical channels or logical channel groups of the terminal device may be determined, to determine a logical channel or a logical channel group that is mapped to transmission characteristic information matching the transmission characteristic information to which the UL grant is mapped, and then, a BSR of a logical channel group including the matched logical channel is reported to the network device, or a BSR of the matched logical channel group is reported to the network device.

It should be noted that, in addition to the difference, for explanations of related content and corresponding beneficial effects of the communication method 500, refer to the embodiment corresponding to the communication method 200 in the method embodiment provided above. Details are not described herein again.

The BSR described in the foregoing embodiments may be a regular BSR (Regular BSR) or a periodic BSR (Periodic BSR).

The foregoing describes the communication method provided in the embodiments of this application, and the following describes a communications device provided in the embodiments of this application.

Figure 6:
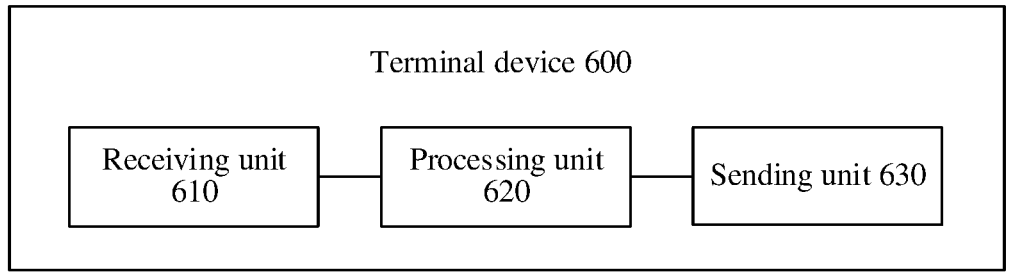
FIG. 6 is a schematic block diagram of a terminal device according to an embodiment of this application.

FIG. 6 is a schematic block diagram of a terminal device 600 according to an embodiment of this application. The terminal device 600 includes the following units:

a receiving unit 610, configured to receive an uplink grant UL grant from a network device, where the UL grant is used to indicate an uplink transmission resource, and the UL grant is further used to indicate transmission characteristic information;

a processing unit 620, configured to determine a first logical channel group, where each logical channel in the first logical channel group is mapped to one or more pieces of transmission characteristic information, and transmission characteristic information to which at least one logical channel in the first logical channel group is mapped matches the transmission characteristic information indicated by the UL grant received by the receiving unit; and a sending unit 630, configured to send, to the network device by using the uplink transmission resource, a buffer status report BSR of the first logical channel group determined by the processing unit.

Therefore, in this embodiment of this application, in addition to the uplink transmission resource, the UL grant is further used to indicate the transmission characteristic information. Each logical channel is also mapped to transmission characteristic information, and only when transmission characteristic information to which a logical channel is mapped matches the transmission characteristic information indicated by the UL grant, a BSR of a logical channel group including the logical channel is transmitted on the uplink transmission resource indicated by the UL grant, so that differentiated scheduling of different services can be met, to meet differentiated requirements of the different services. However, a scheduling manner in the prior art is at a terminal device level. For a same terminal device, differentiated scheduling cannot be implemented, and consequently differentiated requirements of different services cannot be met.

Optionally, in an embodiment, the first logical channel group is mapped to one or more pieces of transmission characteristic information, and the transmission characteristic information to which the first logical channel group is mapped matches the transmission characteristic information indicated by the UL grant.

Optionally, in an embodiment, that transmission characteristic information to which at least one logical channel in the first logical channel group is mapped matches the transmission characteristic information indicated by the UL grant includes: The transmission characteristic information to which the at least one logical channel in the first logical channel group is mapped is the same as the transmission characteristic information indicated by the UL grant.

Optionally, in an embodiment, the transmission characteristic information indicated by the UL grant includes at least one transmission parameter, and the transmission characteristic information to which each logical channel in the first logical channel group is mapped includes at least one transmission parameter. That transmission characteristic information to which at least one logical channel in the first logical channel group is mapped matches the transmission characteristic information indicated by the UL grant includes: At least one transmission parameter included in the transmission characteristic information to which the at least one logical channel in the first logical channel group is mapped is the same as the transmission parameter included in the transmission characteristic information indicated by the UL grant.

Optionally, in an embodiment, the transmission characteristic information indicated by the UL grant includes at least one transmission parameter, and the transmission characteristic information to which each logical channel in the first logical channel group is mapped includes at least one transmission parameter. That transmission characteristic information to which at least one logical channel in the first logical channel group is mapped matches the transmission characteristic information indicated by the UL grant includes: At least one transmission parameter included in the transmission characteristic information to which the at least one logical channel in the first logical channel group is mapped meets a specified condition, where the specified condition is determined by a value of the transmission parameter included in the transmission characteristic information indicated by the UL grant.

Optionally, in an embodiment, that the transmission characteristic information to which the first logical channel group is mapped matches the transmission characteristic information indicated by the UL grant includes: The transmission characteristic information to which the first logical channel group is mapped is the same as the transmission characteristic information indicated by the UL grant.

Optionally, in an embodiment, the transmission characteristic information indicated by the UL grant includes at least one transmission parameter, and the transmission characteristic information to which each logical channel in the first logical channel group is mapped includes at least one transmission parameter. That the transmission characteristic information to which the first logical channel group is mapped matches the transmission characteristic information indicated by the UL grant includes: At least one transmission parameter included in the transmission characteristic information to which the first logical channel group is mapped is the same as the transmission parameter included in the transmission characteristic information indicated by the UL grant.

Optionally, in an embodiment, the transmission characteristic information indicated by the UL grant includes at least one transmission parameter, and the transmission characteristic information to which each logical channel in the first logical channel group is mapped includes at least one transmission parameter. That the transmission characteristic information to which the first logical channel group is mapped matches the transmission characteristic information indicated by the UL grant includes: At least one transmission parameter included in the transmission characteristic information to which the first logical channel group is mapped meets a specified condition, where the specified condition is determined by a value of the transmission parameter included in the transmission characteristic information indicated by the UL grant.

Optionally, in an embodiment, the UL grant includes an identifier used to indicate the transmission characteristic information, and the processing unit 620 is further configured to: obtain a correspondence between the transmission characteristic information and the identifier; and obtain, based on the correspondence and the identifier included in the UL grant, the transmission characteristic information indicated by the UL grant.

Optionally, in an embodiment, the transmission characteristic information indicated by the UL grant includes at least one of the following transmission parameters, and the transmission characteristic information to which each logical channel in the first logical channel group is mapped also includes at least one of the following transmission parameters: a transmission time interval TTI of the uplink transmission resource, a subcarrier spacing SCS of the uplink transmission resource, carrier information of the uplink transmission resource, $K_2$, a resource cycle of the uplink transmission resource, a round-trip time (Round-Trip Time, RTT) of the uplink transmission resource, a slot (Slot) of the uplink transmission resource, a quantity of symbols (Symbol) included in the slot, a quantity of carriers occupied by the uplink transmission resource in frequency domain, a coding scheme corresponding to the uplink transmission resource, a multiple access mode corresponding to the uplink transmission resource, whether to perform frequency domain repetition transmission on the uplink transmission resource, whether to perform time domain repetition transmission on the uplink transmission resource, and transmit power information corresponding to the uplink transmission resource. $K_2$ indicates a time interval from a moment at which downlink control information DCI used for uplink scheduling is received to a moment at which uplink data is sent on the uplink transmission resource.

Optionally, in an embodiment, the processing unit 620 is further configured to determine a second logical channel group, where each logical channel in the second logical channel group is mapped to one or more pieces of transmission characteristic information, and transmission characteristic information to which at least one logical channel in the second logical channel group is mapped matches the transmission characteristic information indicated by the UL grant. The sending unit 630 is specifically configured to send BSRs of the first logical channel group and the second logical channel group to the network device.

Optionally, in an embodiment, the processing unit 620 is further configured to cancel a BSR of a to-be-canceled logical channel, where the to-be-canceled logical channel includes a logical channel whose BSR has been reported and/or a logical channel on which all to-be-transmitted data has been transmitted.

It should be understood that the processing unit 620 may be implemented by using a processor or a processor-related circuit component. The receiving unit 610 may be implemented by using a receiver or a receiver-related circuit component. The sending unit 630 may be implemented by using a transmitter or a transmitter-related circuit component.

Figure 7:
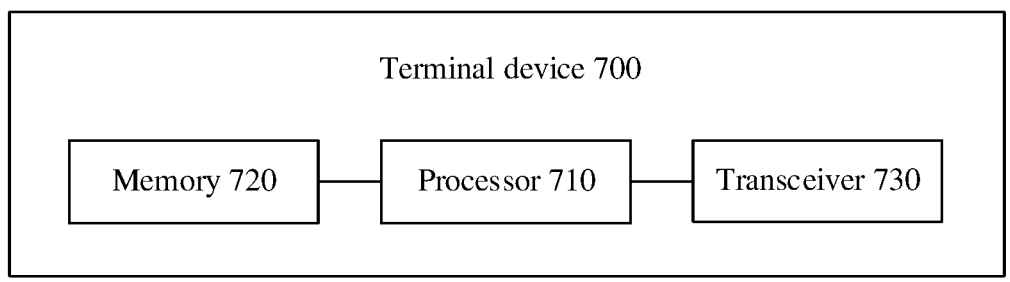
FIG. 7 is another schematic block diagram of a terminal device according to an embodiment of this application.

As shown in FIG. 7, an embodiment of this application further provides a terminal device 700. The terminal device 700 includes a processor 710, a memory 720, and a transceiver 730. The memory 720 is configured to store an instruction (or a computer program). The processor 710 is configured to execute the instruction stored in the memory 720, and the processor 710 is further configured to control the transceiver 730 to receive or send a signal. When the instruction stored in the memory 720 is executed, the transceiver 730 is configured to perform the operations performed by the receiving unit 610 and the sending unit 630 in the foregoing embodiment, and the processor 710 is configured to perform the operations performed by the processing unit 620 in the foregoing embodiment.

It should be understood that the terminal device 600 or the terminal device 700 provided in the embodiments of this application may correspond to the terminal device in the communication method 200 in the foregoing method embodiments, and the units of the terminal device 600 or the terminal device 700 are also configured to perform related operations in the communication method 200 in the foregoing method embodiments. For details, refer to the foregoing descriptions. Details are not described herein again.

Figure 8:
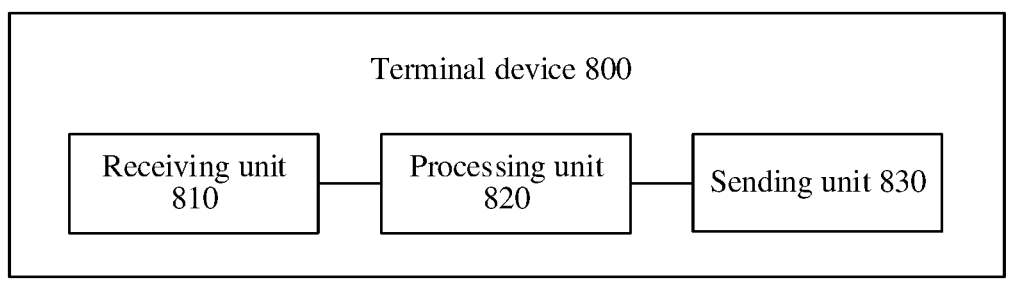
FIG. 8 is a schematic block diagram of another terminal device according to an embodiment of this application.

FIG. 8 is a schematic block diagram of a terminal device 800 according to an embodiment of this application. The terminal device 800 includes the following units:

a receiving unit 810, configured to receive an uplink grant UL grant from a network device, where the UL grant is used to indicate an uplink transmission resource, and the UL grant is further used to indicate transmission characteristic information;

a processing unit 820, configured to determine that transmission characteristic information to which a first logical channel is mapped matches the transmission characteristic information indicated by the UL grant, where the first logical channel is a logical channel that triggers a buffer status report BSR; and a sending unit 830, configured to send, to the network device by using the uplink transmission resource, the BSR of a logical channel group including the first logical channel.

In this application, in addition to the uplink transmission resource, the UL grant is further used to indicate the transmission characteristic information, and only when the transmission characteristic information to which the first logical channel is mapped matches the transmission characteristic information indicated by the UL grant, the BSR of the logical channel group including the first logical channel is transmitted on the uplink transmission resource indicated by the UL grant, so that differentiated scheduling of different services can be met, to meet differentiated requirements of the different services. However, a scheduling manner in the prior art is at a terminal device level. For a same terminal device, differentiated scheduling cannot be implemented, and consequently differentiated requirements of different services cannot be met.

Optionally, in an embodiment, that transmission characteristic information to which a first logical channel is mapped matches the transmission characteristic information indicated by the UL grant includes: The transmission characteristic information indicated by the UL grant is the same as the transmission characteristic information to which the first logical channel is mapped.

Optionally, in an embodiment, the transmission characteristic information indicated by the UL grant includes at least one transmission parameter, and the transmission characteristic information to which the first logical channel is mapped includes at least one transmission parameter. That transmission characteristic information to which a first logical channel is mapped matches the transmission characteristic information indicated by the UL grant includes: The at least one transmission parameter included in the transmission characteristic information to which the first logical channel is mapped is the same as the transmission parameter included in the transmission characteristic information indicated by the UL grant.

Optionally, in an embodiment, the transmission characteristic information indicated by the UL grant includes at least one transmission parameter, and the transmission characteristic information to which the first logical channel is mapped includes at least one transmission parameter. That transmission characteristic information to which a first logical channel is mapped matches the transmission characteristic information indicated by the UL grant includes: The at least one transmission parameter included in the transmission characteristic information to which the first logical channel is mapped meets a specified condition, where the specified condition is determined by a value of the transmission parameter included in the transmission characteristic information indicated by the UL grant.

Optionally, in an embodiment, the UL grant includes an identifier used to indicate the transmission characteristic information, and the processing unit 820 is further configured to: obtain a correspondence between the transmission characteristic information and the identifier; and obtaining, based on the correspondence and the identifier included in the UL grant, the transmission characteristic information indicated by the UL grant.

Optionally, in an embodiment, the transmission characteristic information indicated by the UL grant includes at least one of the following transmission parameters, and the transmission characteristic information to which the first logical channel is mapped also includes at least one of the following transmission parameters: a transmission time interval TTI of the uplink transmission resource, a subcarrier spacing SCS of the uplink transmission resource, carrier information of the uplink transmission resource, and $K_2$, where $K_2$ indicates a time interval from a moment at which downlink control information DCI used for uplink scheduling is received to a moment at which uplink data is sent on the uplink transmission resource.

Optionally, in an embodiment, the processing unit 820 is further configured to cancel a BSR of a to-be-canceled logical channel, where the to-be-canceled logical channel includes a logical channel whose BSR has been reported and/or a logical channel on which all to-be-transmitted data has been transmitted.

It should be understood that the processing unit 820 may be implemented by using a processor or a processor-related circuit component. The receiving unit 810 may be implemented by using a receiver or a receiver-related circuit component. The sending unit 830 may be implemented by using a transmitter or a transmitter-related circuit component.

Figure 9:
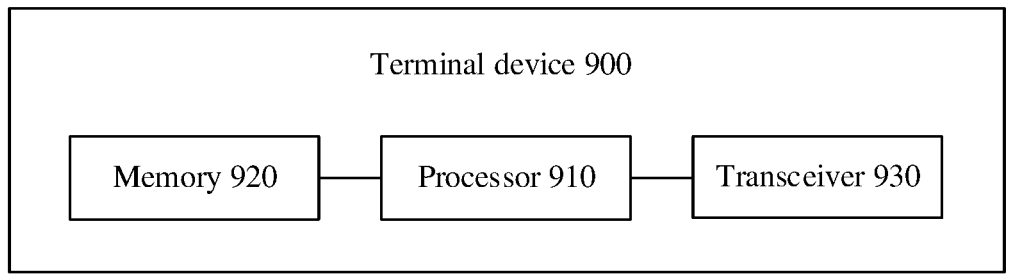
FIG. 9 is another schematic block diagram of another terminal device according to an embodiment of this application.

As shown in FIG. 9, an embodiment of this application further provides a terminal device 900. The terminal device 900 includes a processor 910, a memory 920, and a transceiver 930. The memory 920 is configured to store an instruction (or a computer program). The processor 910 is configured to execute the instruction stored in the memory 920. The processor 910 is further configured to control the transceiver 930 to receive or send a signal. When the instruction stored in the memory 920 is executed, the transceiver 930 is configured to perform the operations performed by the receiving unit 810 and the sending unit 830 in the foregoing embodiment, and the processor 910 is configured to perform the operations performed by the processing unit 820 in the foregoing embodiment.

It should be understood that the terminal device 800 or the terminal device 900 provided in the embodiments of this application may correspond to the terminal device in the communication method 500 in the foregoing method embodiments, and the units of the terminal device 800 or the terminal device 900 are also configured to perform related operations in the communication method 500 in the foregoing method embodiments. For details, refer to the foregoing descriptions. Details are not described herein again.

Figure 10:
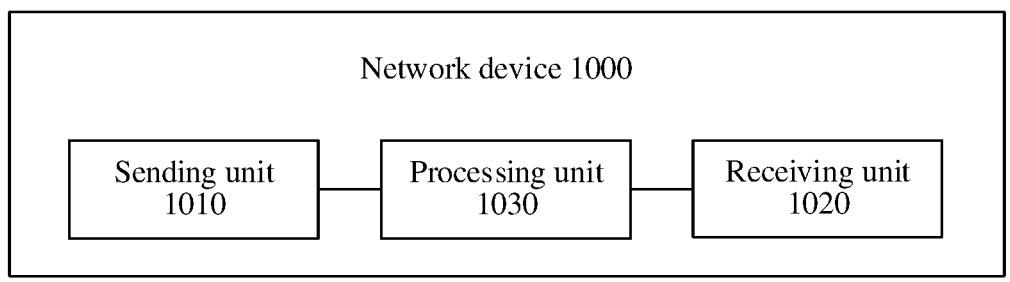
FIG. 10 is a schematic block diagram of a network device according to an embodiment of this application.

FIG. 10 is a schematic block diagram of a network device 1000 according to an embodiment of this application. The network device 1000 includes the following units:

a sending unit 1010, configured to send an uplink grant UL grant to a terminal device, where the UL grant is used to indicate an uplink transmission resource, and the UL grant is further used to indicate transmission characteristic information; and a receiving unit 1020, configured to receive, by using the uplink transmission resource, a buffer status report BSR, of a first logical channel group, that is sent by the terminal device, where each logical channel in the first logical channel group is mapped to one or more pieces of transmission characteristic information, and transmission characteristic information to which at least one logical channel in the first logical channel group is mapped matches the transmission characteristic information indicated by the UL grant.

Therefore, in this embodiment of this application, in addition to the uplink transmission resource, the UL grant is further used to indicate the transmission characteristic information. Each logical channel is also mapped to transmission characteristic information, and only when transmission characteristic information to which a logical channel is mapped matches the transmission characteristic information indicated by the UL grant, a BSR of a logical channel group including the logical channel is transmitted on the uplink transmission resource indicated by the UL grant, so that differentiated scheduling of different services can be met, to meet differentiated requirements of the different services. However, a scheduling manner in the prior art is at a terminal device level. For a same terminal device, differentiated scheduling cannot be implemented, and consequently differentiated requirements of different services cannot be met.

Optionally, in an embodiment, at least one logical channel in the first logical channel group includes a first logical channel, and the first logical channel is a logical channel that triggers a BSR.

Optionally, in an embodiment, the first logical channel group is mapped to one or more pieces of transmission characteristic information, and the transmission characteristic information to which the first logical channel group is mapped matches the transmission characteristic information indicated by the UL grant.

Optionally, in an embodiment, that transmission characteristic information to which at least one logical channel in the first logical channel group is mapped matches the transmission characteristic information indicated by the UL grant includes: The transmission characteristic information to which the at least one logical channel in the first logical channel group is mapped is the same as the transmission characteristic information indicated by the UL grant.

Optionally, in an embodiment, the transmission characteristic information indicated by the UL grant includes at least one transmission parameter, and transmission characteristic information to which each logical channel in the first logical channel group is mapped includes at least one transmission parameter. That transmission characteristic information to which at least one logical channel in the first logical channel group is mapped matches the transmission characteristic information indicated by the UL grant includes: At least one transmission parameter included in the transmission characteristic information to which the at least one logical channel in the first logical channel group is mapped is the same as the transmission parameter included in the transmission characteristic information indicated by the UL grant.

Optionally, in an embodiment, the transmission characteristic information indicated by the UL grant includes at least one transmission parameter, and transmission characteristic information to which each logical channel in the first logical channel group is mapped includes at least one transmission parameter. That transmission characteristic information to which at least one logical channel in the first logical channel group is mapped matches the transmission characteristic information indicated by the UL grant includes: At least one transmission parameter included in the transmission characteristic information to which the at least one logical channel in the first logical channel group is mapped meets a specified condition, where the specified condition is determined by a value of the transmission parameter included in the transmission characteristic information indicated by the UL grant.

Optionally, in an embodiment, that the transmission characteristic information to which the first logical channel group is mapped matches the transmission characteristic information indicated by the UL grant includes: The transmission characteristic information to which the first logical channel group is mapped is the same as the transmission characteristic information indicated by the UL grant.

Optionally, in an embodiment, the transmission characteristic information indicated by the UL grant includes at least one transmission parameter, and transmission characteristic information to which each logical channel in the first logical channel group is mapped includes at least one transmission parameter. That the transmission characteristic information to which the first logical channel group is mapped matches the transmission characteristic information indicated by the UL grant includes: At least one transmission parameter included in the transmission characteristic information to which the first logical channel group is mapped is the same as the transmission parameter included in the transmission characteristic information indicated by the UL grant.

Optionally, in an embodiment, the transmission characteristic information indicated by the UL grant includes at least one transmission parameter, and transmission characteristic information to which each logical channel in the first logical channel group is mapped includes at least one transmission parameter. That the transmission characteristic information to which the first logical channel group is mapped matches the transmission characteristic information indicated by the UL grant includes: At least one transmission parameter included in the transmission characteristic information to which the first logical channel group is mapped meets a specified condition, where the specified condition is determined by a value of the transmission parameter included in the transmission characteristic information indicated by the UL grant.

Optionally, in an embodiment, the UL grant includes an identifier used to indicate the transmission characteristic information; and the sending unit 1010 is further configured to send a correspondence between the transmission characteristic information and the identifier to the terminal device.

As shown in FIG. 10, optionally, in an embodiment, the network device 1000 further includes:

a processing unit 1030, configured to map one or more pieces of transmission characteristic information to each logical channel in the first logical channel group; and/or map one or more pieces of transmission characteristic information to the first logical channel group.

Optionally, in an embodiment, the transmission characteristic information indicated by the UL grant includes at least one of the following transmission parameters, and the transmission characteristic information to which each logical channel in the first logical channel group is mapped also includes at least one of the following transmission parameters: a transmission time interval TTI of the uplink transmission resource, a subcarrier spacing SCS of the uplink transmission resource, carrier information of the uplink transmission resource, $K_2$, a resource cycle of the uplink transmission resource, a round-trip time (Round-Trip Time, RTT) of the uplink transmission resource, a slot (Slot) of the uplink transmission resource, a quantity of symbols (Symbol) included in the slot, a quantity of carriers occupied by the uplink transmission resource in frequency domain, a coding scheme corresponding to the uplink transmission resource, a multiple access mode corresponding to the uplink transmission resource, whether to perform frequency domain repetition transmission on the uplink transmission resource, whether to perform time domain repetition transmission on the uplink transmission resource, and transmit power information corresponding to the uplink transmission resource. $K_2$ indicates a time interval from a moment at which downlink control information DCI used for uplink scheduling is received to a moment at which uplink data is sent on the uplink transmission resource.

Optionally, in an embodiment, the receiving unit 1020 is further configured to receive, by using the uplink transmission resource, a BSR, of a second logical channel group, that is sent by the terminal device, where each logical channel in the second logical channel group is mapped to one or more pieces of transmission characteristic information, and transmission characteristic information to which at least one logical channel in the second logical channel group is mapped matches the transmission characteristic information indicated by the UL grant.

It should be understood that the processing unit 1030 may be implemented by using a processor or a processor-related circuit component. The receiving unit 1020 may be implemented by using a receiver or a receiver-related circuit component. The sending unit 1010 may be implemented by using a transmitter or a transmitter-related circuit component.

Figure 11:
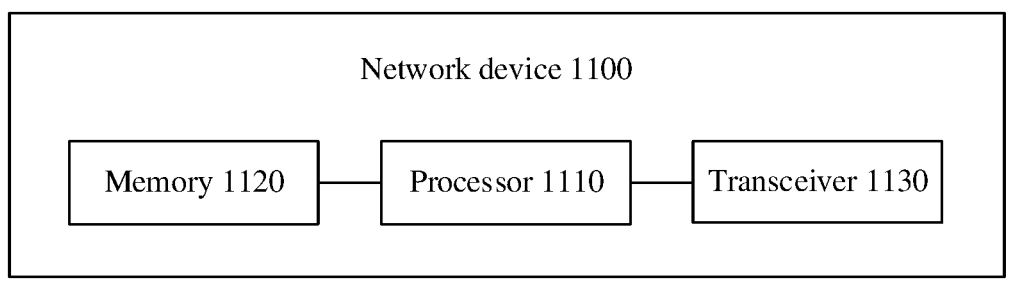
FIG. 11 is another schematic block diagram of a network device according to an embodiment of this application.

As shown in FIG. 11, an embodiment of this application further provides a network device 1100. The network device 1100 includes a processor 1110, a memory 1120, and a transceiver 1130. The memory 1120 is configured to store an instruction (or a computer program). The processor 1110 is configured to execute the instruction stored in the memory 1120. The processor 1110 is further configured to control the transceiver 1130 to receive or send a signal. When the instruction stored in the memory 1120 is executed, the transceiver 1130 is configured to perform the operations performed by the sending unit 1010 and the receiving unit 1020 in the foregoing embodiment, and the processor 1110 is configured to perform the operations performed by the processing unit 1030 in the foregoing embodiment.

It should be understood that the network device 1000 or the network device 1100 provided in the embodiments of this application may correspond to the network device in the foregoing method embodiments, and the units of the network device 1000 or the network device 1100 are also configured to perform related operations in the foregoing method embodiments. For details, refer to the foregoing descriptions. Details are not described herein again.

An embodiment of this application further provides a chip. The chip includes a processing unit and a communications interface. The processing unit is configured to perform the operations performed on the terminal device side in the foregoing method embodiments, and the communications interface is configured to communicate with the external.

Optionally, the chip may further include a storage unit, and the storage unit stores an instruction. The processing unit is configured to execute the instruction stored in the storage unit. When executing the instruction, the processing unit is configured to perform the operations performed on the terminal device side in the foregoing method embodiments.

An embodiment of this application further provides a chip. The chip includes a processing unit and a communications interface. The processing unit is configured to perform the operations performed by the network device in the foregoing method embodiments, and the communications interface is configured to communicate with the external.

Optionally, the chip may further include a storage unit, and the storage unit stores an instruction. The processing unit is configured to execute the instruction stored in the storage unit. When executing the instruction, the processing unit is configured to perform the operations performed by the network device in the foregoing method embodiments.

An embodiment of this application further provides a computer readable storage medium that stores a computer program. When the computer program is executed by a processor, the method on the terminal device side in the foregoing method embodiments can be implemented.

An embodiment of this application further provides a computer readable storage medium that stores a computer program. When the computer program is executed by a processor, the method on the network device side in the foregoing method embodiments can be implemented.

An embodiment of this application further provides a computer program product including an instruction. When the instruction is executed by a computer, the method on the terminal device side in the foregoing method embodiments can be implemented.

An embodiment of this application further provides a computer program product including an instruction. When the instruction is executed by a computer, the method on the network device side in the foregoing method embodiments can be implemented.

An embodiment of this application further provides a communications apparatus, and the communications apparatus may be a terminal device or a circuit. The communications apparatus may be configured to perform actions performed by the terminal device in the foregoing method embodiments.

Figure 12:
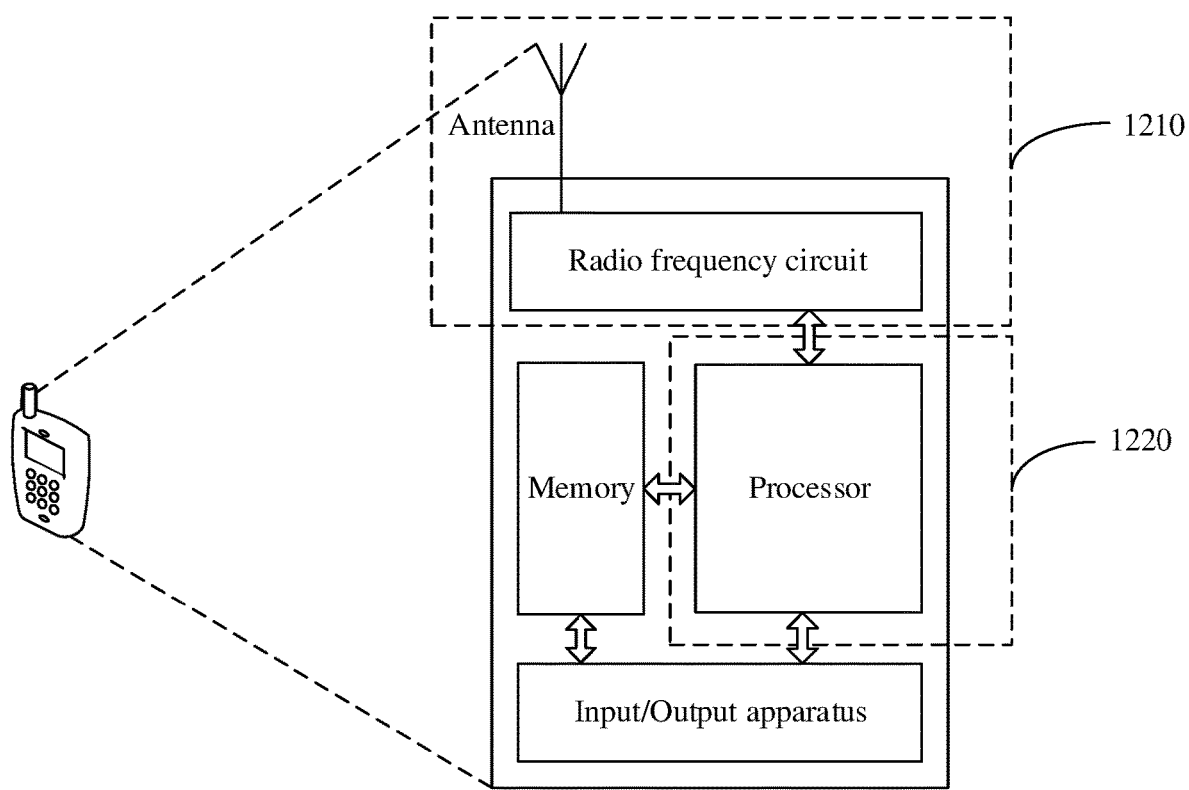
FIG. 12 is a schematic block diagram of a communications apparatus according to an embodiment of this application.

When the communications apparatus is a terminal device, FIG. 12 is a simplified schematic structural diagram of the terminal device. For ease of understanding and illustration, an example in which the terminal device is a mobile phone is used in FIG. 12. As shown in FIG. 12, the terminal device includes a processor, a memory, a radio frequency circuit, an antenna, and an input/output apparatus. The processor is mainly configured to process a communications protocol and communication data, control the terminal device, execute a software program, and process data of the software program. The memory is mainly configured to store the software program and the data. The radio frequency circuit is mainly configured to perform conversion between a baseband signal and a radio frequency signal, and process the radio frequency signal. The antenna is mainly configured to send and receive a radio frequency signal in an electromagnetic wave form. The input/output apparatus such as a touchscreen, a display screen, or a keyboard, is mainly configured to receive data entered by a user and output data to the user. It should be noted that some types of terminal devices may not have the input/output apparatus.

When the processor needs to send data, the processor performs baseband processing on the to-be-sent data, and outputs a baseband signal to the radio frequency circuit. After performing radio frequency processing on the baseband signal, the radio frequency circuit sends a radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 12 shows only one memory and one processor. In an actual terminal device product, there may be one or more processors and one or more memories. The memory may alternatively be referred to as a storage medium, a storage device, or the like. The memory may be disposed independent of the processor, or may be integrated with the processor. This is not limited in this embodiment of this application.

In this embodiment of this application, the antenna and the radio frequency circuit that have a transceiver function may be considered as a transceiver unit of the terminal device, and the processor that has a processing function may be considered as a processing unit of the terminal device. As shown in FIG. 12, the terminal device includes a transceiver unit 1210 and a processing unit 1220. The transceiver unit may alternatively be referred to as a transceiver, a transceiver apparatus, or the like. The processing unit may alternatively be referred to as a processor, a processing board, a processing module, a processing apparatus, or the like. Optionally, a component for implementing a receiving function in the transceiver unit 1210 may be considered as a receiving unit, and a component for implementing a sending function in the transceiver unit 1210 may be considered as a sending unit. In other words, the transceiver unit 1210 includes the receiving unit and the sending unit. The transceiver unit sometimes may alternatively be referred to as a transceiver, a transceiver circuit, or the like. The receiving unit sometimes may alternatively be referred to as a receiver, a receiver circuit, or the like. The sending unit sometimes may alternatively be referred to as a transmitter, a transmitter circuit, or the like.

It should be understood that the transceiver unit 1210 is configured to perform a sending operation and a receiving operation on the terminal device side in the foregoing method embodiments, and the processing unit 1220 is configured to perform an operation other than the receiving/sending operation of the terminal device in the foregoing method embodiments.

For example, in an implementation, the transceiver unit 1210 is configured to perform the receiving operation on the terminal device side in step 210 or the sending operation on the terminal device side in step 230 in FIG. 2, and/or the transceiver unit 1210 is further configured to perform other receiving and sending steps on the terminal device side in the embodiments of this application. The processing unit 1220 is configured to perform step 220 in FIG. 2, and/or the processing unit 1220 is further configured to perform another processing step on the terminal device side in the embodiments of this application.

For another example, in another implementation, the transceiver unit 1210 is configured to perform the receiving operation on the terminal device side in step 510 or the sending operation on the terminal device side in step 530 in FIG. 5, and/or the transceiver unit 1210 is further configured to perform other receiving and sending steps on the terminal device side in the embodiments of this application. The processing unit 1220 is configured to perform step 520 in FIG. 5, and/or the processing unit 1220 is further configured to perform another processing step on the terminal device side in the embodiments of this application.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

Figure 13:
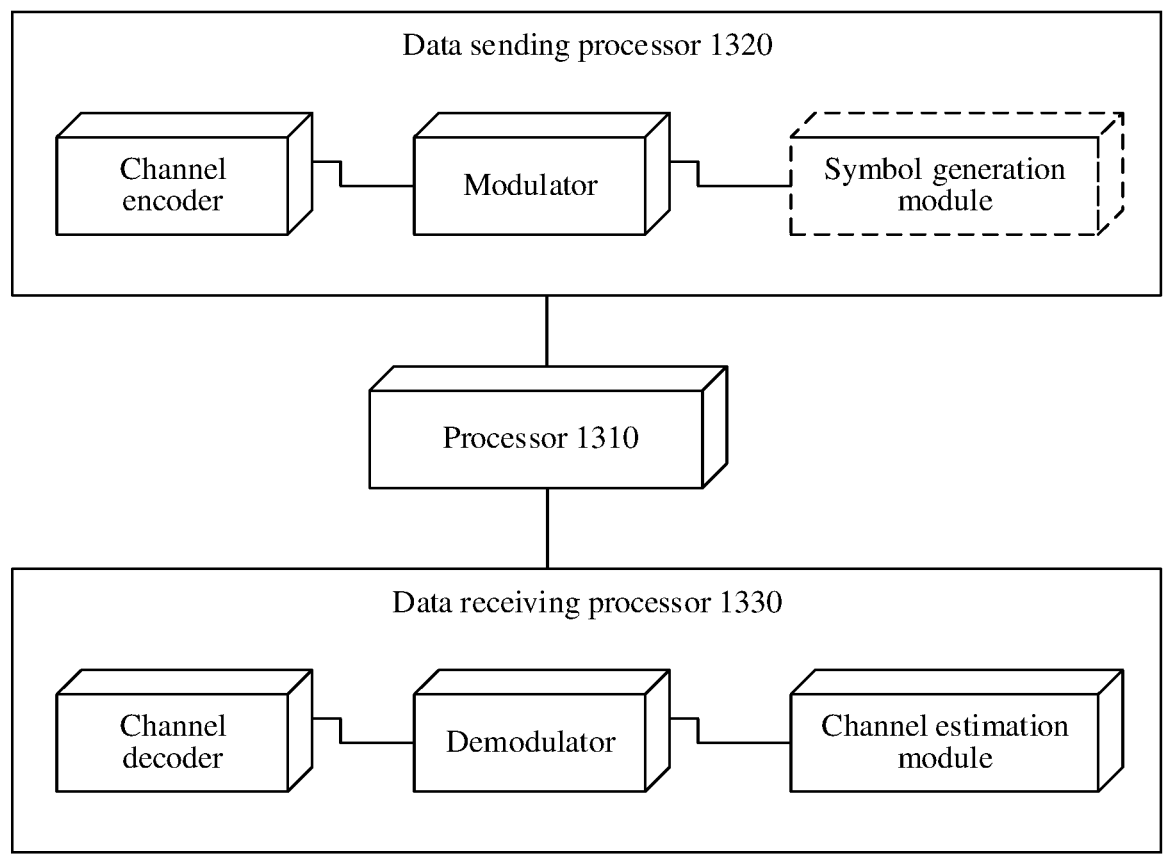
FIG. 13 is another schematic block diagram of a communications apparatus according to an embodiment of this application.

When the communications apparatus in this embodiment is a terminal device, refer to a device shown in FIG. 13. In an example, the device may implement a function similar to a function of the processor 710 in FIG. 7 or a function of the processor 910 in FIG. 9. In FIG. 13, the device includes a processor 1310, a data sending processor 1320, and a data receiving processor 1330. The processing unit 620 or the processing unit 820 in the foregoing embodiments may be the processor 1310 in FIG. 13, and implements a corresponding function. The receiving unit 610 or the receiving unit 810 in the foregoing embodiments may be the receiving data processor 1330 in FIG. 13, and the sending unit 630 and the sending unit 830 in the foregoing embodiments may be the sending data processor 1320 in FIG. 13. Although FIG. 13 shows a channel encoder and a channel decoder, it may be understood that these modules are merely examples, and do not constitute a limitation on this embodiment.

Figure 14:
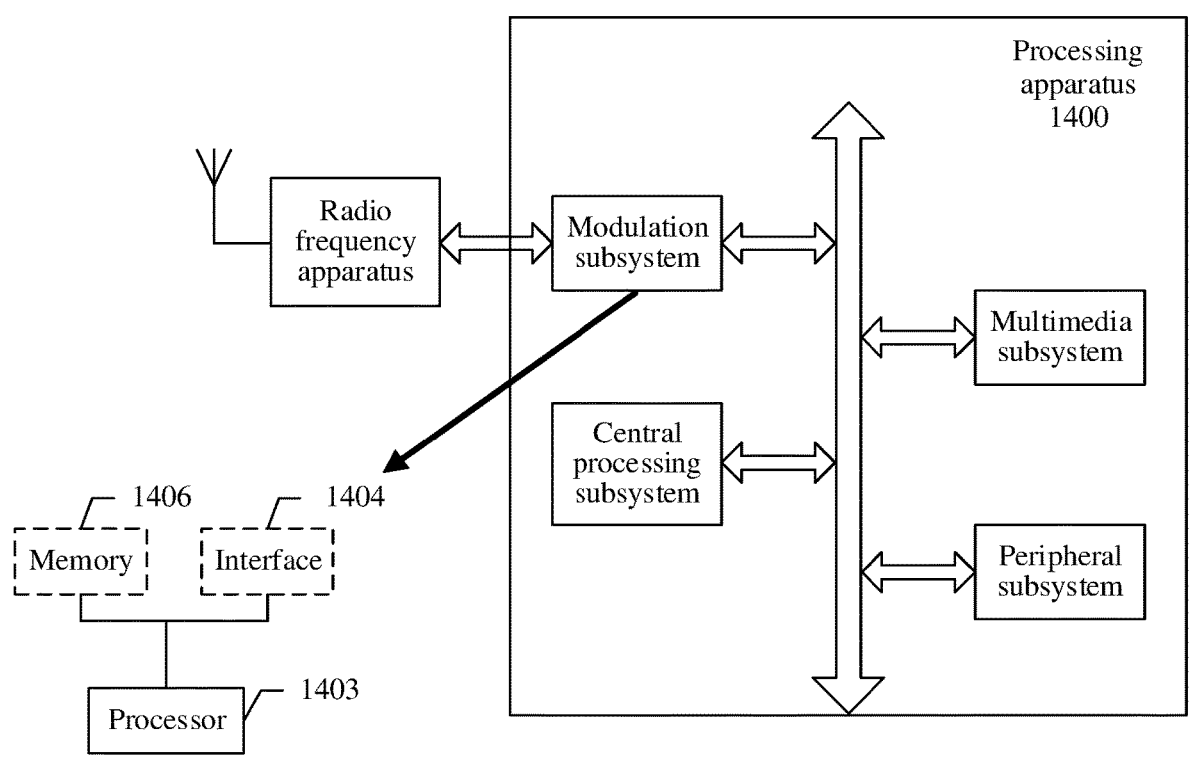
FIG. 14 is still another schematic block diagram of a communications apparatus according to an embodiment of this application.

FIG. 14 shows another form of this embodiment. A processing apparatus 1400 includes modules such as a modulation subsystem, a central processing subsystem, and a peripheral subsystem. The communications apparatus in this embodiment may be used as the modulation subsystem in the processing apparatus 1400. Specifically, the modulation subsystem may include a processor 1403 and an interface 1404. The processor 1403 implements a function of the processing module 710, and the interface 1404 implements a function of the transceiver module 720. In another variation, the modulation subsystem includes a memory 1406, a processor 1403, and a program that is stored in the memory 1406 and that can be run on the processor. When executing the program, the processor 1403 implements the method on the terminal device side in the foregoing method embodiments. It should be noted that the memory 1406 may be non-volatile or volatile. The memory 1406 may be located in the modulation subsystem, or may be located in the processing apparatus 1400, provided that the memory 1406 can be connected to the processor 1403.

It should be understood that, the processor in the embodiments of the present invention may be a central processing unit (CPU), the processor may further be another general purpose processor, a digital signal processor (DSP), an application specific integrated circuit (ASIC), a field programmable gate array (FPGA), or another programmable logic device, a discrete gate or transistor logic device, a discrete hardware component, or the like. The general purpose processor may be a microprocessor, or the processor may be any conventional processor or the like.

It may be understood that the memory in the embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (Electrically EPROM, EEPROM), or a flash memory. The volatile memory may be a random access memory (RAM), used as an external cache. By way of example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus random access memory (Direct Rambus RAM, DR RAM).

It should be noted that when the processor is a general purpose processor, a DSP, an ASIC, an FPGA, or another programmable logic device, a discrete gate or transistor logic device, or a discrete hardware component, the memory (storage module) is integrated into the processor.

It should be noted that the memory described in this specification is intended to include but is not limited to these memories and any other proper type of memory.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   receiving, by a terminal device, an uplink grant (UL) grant from a network device, wherein the UL grant is used to indicate an uplink transmission resource, and the UL grant is further used to indicate transmission characteristic information;
   determining, by the terminal device, whether transmission characteristic information to which a first logical channel of a first logical channel group is mapped matches the transmission characteristic information indicated by the UL grant, wherein the first logical channel is a logical channel that triggers a buffer status report (BSR);

in response to the transmission characteristic information to which the first logical channel is mapped matching the transmission characteristic information indicated by the UL grant, sending, by the terminal device, the BSR of the first logical channel group comprising the first logical channel to the network device by using the uplink transmission resource; and canceling, by the terminal device, the BSR of the first logical channel group, wherein the communication method further comprises:

canceling, by the terminal device, a second BSR of a to-be-canceled logical channel, wherein the to-be-canceled logical channel is a logical channel on which all to-be-transmitted data has been transmitted.

2. The communication method according to claim 1, wherein the transmission characteristic information to which the first logical channel is mapped matching the transmission characteristic information indicated by the UL grant comprises: values of transmission parameters of the transmission characteristic information indicated by the UL grant being the same as values of transmission parameters of the transmission characteristic information to which the first logical channel is mapped.

3. The communication method according to claim 1, wherein the transmission characteristic information indicated by the UL grant comprises at least one transmission parameter, and the transmission characteristic information to which the first logical channel is mapped comprises at least one transmission parameter; and the transmission characteristic information to which the first logical channel is mapped matching the transmission characteristic information indicated by the UL grant comprises: the at least one transmission parameter comprised in the transmission characteristic information to which the first logical channel is mapped meeting a specified condition, wherein the specified condition is determined by a value of the transmission parameter comprised in the transmission characteristic information indicated by the UL grant.

4. The communication method according to claim 1, wherein the transmission characteristic information indicated by the UL grant comprises at least one of the following transmission parameters, and the transmission characteristic information to which the first logical channel is mapped also comprises at least one of the following transmission parameters: a transmission time interval (TTI) of the uplink transmission resource, a subcarrier spacing (SCS) of the uplink transmission resource, carrier information of the uplink transmission resource, and $K_2$, wherein $K_2$ indicates a time interval from a moment at which downlink control information (DCI) used for uplink scheduling is received to a moment at which uplink data is sent on the uplink transmission resource.

5. A terminal device, comprising a processor; and a non-transitory computer readable medium storing instructions, that when executed by the processor, cause the terminal device to perform steps comprising:

receiving an uplink grant (UL) grant from a network device, wherein the UL grant is used to indicate an uplink transmission resource, and the UL grant is further used to indicate transmission characteristic information;

determining whether transmission characteristic information to which a first logical channel of a first logical channel group is mapped matches the transmission characteristic information indicated by the UL grant, wherein the first logical channel is a logical channel that triggers a buffer status report (BSR);

in response to the transmission characteristic information to which the first logical channel is mapped matching the transmission characteristic information indicated by the UL grant, sending the BSR of the first logical channel group comprising the first logical channel to the network device by using the uplink transmission resource; and canceling the BSR of the first logical channel group, wherein the steps further comprise:

canceling a second BSR of a to-be-canceled logical channel, wherein the to-be-canceled logical channel is a logical channel on which all to-be-transmitted data has been transmitted.

6. The terminal device according to claim 5, wherein the transmission characteristic information to which the first logical channel is mapped matching the transmission characteristic information indicated by the UL grant comprises: values of transmission parameters of the transmission characteristic information indicated by the UL grant being the same as values of transmission parameters of the transmission characteristic information to which the first logical channel is mapped.

7. The terminal device according to claim 5, wherein the transmission characteristic information indicated by the UL grant comprises at least one transmission parameter, and the transmission characteristic information to which the first logical channel is mapped comprises at least one transmission parameter; and the transmission characteristic information to which the first logical channel is mapped matching the transmission characteristic information indicated by the UL grant comprises: the at least one transmission parameter comprised in the transmission characteristic information to which the first logical channel is mapped meeting a specified condition, wherein the specified condition is determined by a value of the transmission parameter comprised in the transmission characteristic information indicated by the UL grant.

8. The terminal device according to claim 5, wherein the transmission characteristic information indicated by the UL grant comprises at least one of the following transmission parameters, and the transmission characteristic information to which the first logical channel is mapped also comprises at least one of the following transmission parameters: a transmission time interval (TTI) of the uplink transmission resource, a subcarrier spacing SCS of the uplink transmission resource, carrier information of the uplink transmission resource, and $K_2$, wherein $K_2$ indicates a time interval from a moment at which downlink control information (DCI) used for uplink scheduling is received to a moment at which uplink data is sent on the uplink transmission resource.

9. The communication method according to claim 1, wherein the transmission characteristic information indicated by the UL grant comprises at least one transmission parameter, and the transmission characteristic information to which the first logical channel is mapped comprises at least one transmission parameter; and that transmission characteristic information to which a first logical channel is mapped matching the transmission characteristic information indicated by the UL grant comprises: the at least one transmission parameter comprised in the transmission characteristic information to which the first logical channel is mapped being the same as the transmission parameter comprised in the transmission characteristic information indicated by the UL grant.

10. The communication method according to claim 1, wherein the UL grant comprises an identifier used to indicate the transmission characteristic information; and
the communication method further comprises:
obtaining a correspondence between the transmission characteristic information and the identifier; and
obtaining, based on the correspondence and the identifier comprised in the UL grant, the transmission characteristic information indicated by the UL grant.

11. The terminal device according to claim 5, wherein the transmission characteristic information indicated by the UL grant comprises at least one transmission parameter, and the transmission characteristic information to which the first logical channel is mapped comprises at least one transmission parameter; and
that transmission characteristic information to which a first logical channel is mapped matching the transmission characteristic information indicated by the UL grant comprises: the at least one transmission parameter comprised in the transmission characteristic information to which the first logical channel is mapped being the same as the transmission parameter comprised in the transmission characteristic information indicated by the UL grant.

12. The terminal device according to claim 5, wherein the UL grant comprises an identifier used to indicate the transmission characteristic information; and
the steps further comprise:
obtaining a correspondence between the transmission characteristic information and the identifier; and
obtain, based on the correspondence and the identifier comprised in the UL grant, the transmission characteristic information indicated by the UL grant.

13. A non-transitory computer-readable storage medium comprising instructions which, when executed by a processor, cause the processor to perform a method comprising:
receiving an uplink grant (UL) grant from a network device, wherein the UL grant is used to indicate an uplink transmission resource, and the UL grant is further used to indicate transmission characteristic information;
determining whether transmission characteristic information to which a first logical channel of a first logical channel group is mapped matches the transmission characteristic information indicated by the UL grant, wherein the first logical channel is a logical channel that triggers a buffer status report (BSR);
in response to the transmission characteristic information to which the first logical channel is mapped matching the transmission characteristic information indicated by the UL grant, sending the BSR of the first logical channel group comprising the first logical channel to the network device by using the uplink transmission resource; and
canceling the BSR of the first logical channel group, wherein the method further comprises:
canceling a second BSR of a to-be-canceled logical channel, wherein the to-be-canceled logical channel is a logical channel on which all to-be-transmitted data has been transmitted.

14. The computer-readable storage medium according to claim 13, wherein the transmission characteristic information to which the first logical channel is mapped matching the transmission characteristic information indicated by the UL grant comprises: values of transmission parameters of the transmission characteristic information indicated by the UL grant being the same as values of transmission parameters of the transmission characteristic information to which the first logical channel is mapped.

15. The computer-readable storage medium according to claim 13, wherein the transmission characteristic information indicated by the UL grant comprises at least one transmission parameter, and the transmission characteristic information to which the first logical channel is mapped comprises at least one transmission parameter; and
the transmission characteristic information to which the first logical channel is mapped matching the transmission characteristic information indicated by the UL grant comprises: the at least one transmission parameter comprised in the transmission characteristic information to which the first logical channel is mapped meeting a specified condition, wherein the specified condition is determined by a value of the transmission parameter comprised in the transmission characteristic information indicated by the UL grant.

16. The computer-readable storage medium according to claim 13, wherein the transmission characteristic information indicated by the UL grant comprises at least one of the following transmission parameters, and the transmission characteristic information to which the first logical channel is mapped also comprises at least one of the following transmission parameters: a transmission time interval (TTI) of the uplink transmission resource, a subcarrier spacing SCS of the uplink transmission resource, carrier information of the uplink transmission resource, and $K_2$, wherein $K_2$ indicates a time interval from a moment at which downlink control information (DCI) used for uplink scheduling is received to a moment at which uplink data is sent on the uplink transmission resource.

17. The computer-readable storage medium according to claim 13, wherein the transmission characteristic information indicated by the UL grant comprises at least one transmission parameter, and the transmission characteristic information to which the first logical channel is mapped comprises at least one transmission parameter; and
that transmission characteristic information to which a first logical channel is mapped matching the transmission characteristic information indicated by the UL grant comprises: the at least one transmission parameter comprised in the transmission characteristic information to which the first logical channel is mapped being the same as the transmission parameter comprised in the transmission characteristic information indicated by the UL grant.

18. The computer-readable storage medium according to claim 13, wherein the UL grant comprises an identifier used to indicate the transmission characteristic information; and
the method further comprises:
obtaining a correspondence between the transmission characteristic information and the identifier; and
obtain, based on the correspondence and the identifier comprised in the UL grant, the transmission characteristic information indicated by the UL grant.

* * * * *